(12) United States Patent
Hedayat

(10) Patent No.: US 10,057,806 B2
(45) Date of Patent: Aug. 21, 2018

(54) MULTI-USER COMMUNICATION IN WIRELESS NETWORKS

(71) Applicant: NEWRACOM, INC., Irvine, CA (US)

(72) Inventor: Ahmad Reza Hedayat, Aliso Viejo, CA (US)

(73) Assignee: NEWRACOM, INC., Irvine, CA (US)

( * ) Notice: Subject to any disclaimer, the term of this patent is extended or adjusted under 35 U.S.C. 154(b) by 43 days.

(21) Appl. No.: 15/144,325

(22) Filed: May 2, 2016

(65) Prior Publication Data

US 2016/0323426 A1    Nov. 3, 2016

Related U.S. Application Data

(60) Provisional application No. 62/155,387, filed on Apr. 30, 2015, provisional application No. 62/264,158, filed on Dec. 7, 2015.

(51) Int. Cl.
*H04W 28/02* (2009.01)

(52) U.S. Cl.
CPC ............................... *H04W 28/0268* (2013.01)

(58) Field of Classification Search
CPC ................................................ H04W 28/0268
See application file for complete search history.

(56) References Cited

U.S. PATENT DOCUMENTS

| | | | |
|---|---|---|---|
| 7,283,502 B1 | 10/2007 | Abraham et al. | |
| 2003/0067903 A1 | 4/2003 | Jorgensen | |
| 2006/0227733 A1 | 10/2006 | Frederiks et al. | |
| 2010/0172334 A1 | 7/2010 | Akhmetov | |
| 2011/0149844 A1 | 6/2011 | G. et al. | |
| 2011/0150004 A1 | 6/2011 | Denteneer et al. | |
| 2012/0044844 A1 | 2/2012 | Trainin | |
| 2015/0063111 A1* | 3/2015 | Merlin | H04L 47/12 370/235 |
| 2015/0071233 A1 | 3/2015 | Wang et al. | |
| 2015/0236822 A1* | 8/2015 | Pirskanen | H04L 1/1812 370/329 |
| 2016/0014803 A1* | 1/2016 | Merlin | H04H 20/55 370/236 |

(Continued)

OTHER PUBLICATIONS

International Search Report and Written Opinion for PCT/US2016/030403, filed May 2, 2016.

(Continued)

*Primary Examiner* — Paul H Masur

(57) ABSTRACT

A first wireless device operating in a wireless network generates a frame and transmits the frame to a second wireless device operating in the wireless network. Generating the frame includes inserting, into a Quality of Service (QoS) field of the frame or into a High Throughput (HT) Control field of the frame, buffer status information for one or more traffic identifiers (TIDs). Generating the frame may also include inserting, into the QoS or HT Control field, an indication whether the buffer status information represents all TIDs active between the first and second wireless device. A first wireless device operating in a wireless network receives a frame from a second wireless device operating in the wireless network, and decodes the frame. Decoding the frame includes determining, using a QoS field of the frame or using a HT Control field of the frame, buffer status information for multiple TIDs.

20 Claims, 8 Drawing Sheets

(56) References Cited

U.S. PATENT DOCUMENTS

| | | | |
|---|---|---|---|
| 2016/0100408 A1* | 4/2016 | Hedayat | H04L 65/4076 370/329 |
| 2016/0165607 A1* | 6/2016 | Hedayat | H04W 72/0453 370/338 |
| 2016/0183274 A1* | 6/2016 | Trainin | H04L 5/0055 370/329 |
| 2016/0227533 A1* | 8/2016 | Josiam | H04W 74/006 |
| 2017/0127298 A1* | 5/2017 | Ryu | H04W 24/02 |

OTHER PUBLICATIONS

"Part 11: Wireless LAN Medium Access Control (MAC) and Physical Layer (PHY) Specifications", IEEE Standards 802.11™ -2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™ -2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (The Institute of Electrical and Electronic Engineers, Inc.), New York, NY, USA.

* cited by examiner

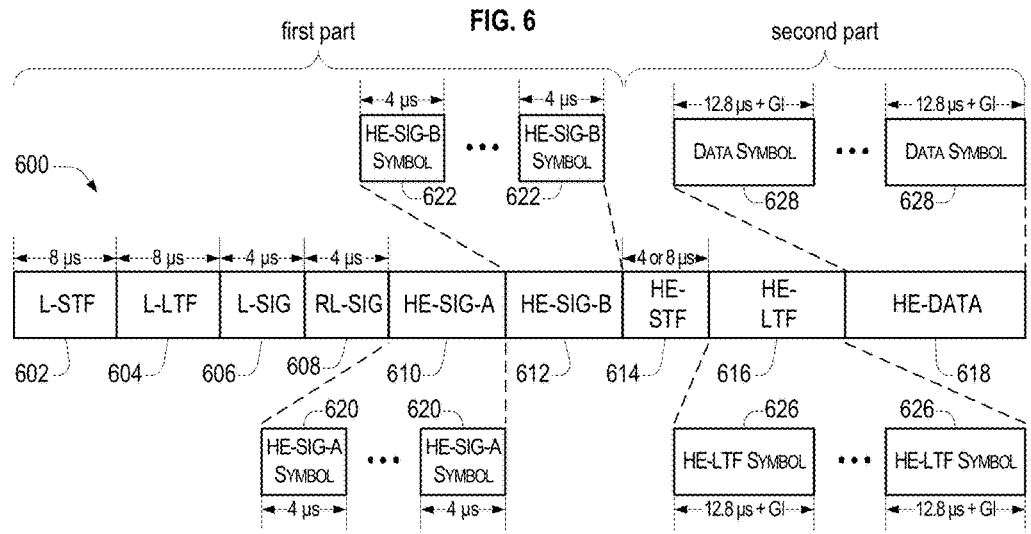

Table 1:

| Element | definition | duration | DFT period | GI | Subcarrier spacing |
|---|---|---|---|---|---|
| Legacy (L)-STF | Non-HT Short Training field | 8 μs | - | - | equiv. to 1,250 kHz |
| L-LTF | Non-HT Long Training field | 8 μs | 3.2 μs | 1.6 μs | 312.5 kHz |
| L-SIG | Non-HT Signal field | 4 μs | 3.2 μs | 0.8 μs | 312.5 kHz |
| RL-SIG | Repeated Non-HT SIGNAL field | 4 μs | 3.2 μs | 0.8 μs | 312.5 kHz |
| HE-SIG-A | HE SIGNAL A field | $N_{HESIGA} * 4$ μs | 3.2 μs | 0.8 μs | 312.5 kHz |
| HE-SIG-B | HE SIGNAL B field | $N_{HESIGB} * 4$ μs | 3.2 μs | 0.8 μs | 312.5 kHz |
| HE-STF | HE Short Training field | 4 or 8 μs | - | - | • non-trigger-based PPDU: (equiv. to) 1,250 kHz; • trigger-based PPDU: (equiv. to) 625 kHz |
| HE-LTF | HE Long Training field | $N_{HELTF} *$ (DFT period + GI)μs | 2xLTF: 6.4 μs 4xLTF: 12.8 μs | supports 0.8, 1.6, 3.2 μs | • 2xLTF: (equiv. to) 156.25 kHz; • 4xLTF: 78.125 kHz |
| HE-DATA | HE DATA field | $N_{DATA} *$ (DFT period + GI)μs | 12.8 μs | supports 0.8, 1.6, 3.2 μs | 78.125 kHz |

MULTI-USER COMMUNICATION IN WIRELESS NETWORKS

CROSS-REFERENCE TO RELATED APPLICATION

This application claims the benefit of U.S. Provisional Patent Application No. 62/155,387, filed Apr. 30, 2015, and U.S. Provisional Patent Application No. 62/264,158, filed Dec. 7, 2015.

BACKGROUND

1. Technical Field

The technology described herein relates generally to wireless networking. More particularly, the technology relates to simultaneous communications between stations in a wireless network using one or more of Multi-User (MU) Multi-Input-Multi-Output (MIMO) and MU Orthogonal Frequency Division Multiple Access (OFDMA) technologies.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

Devices in a WLAN may use rate adaptation to provide reliable communication and high data throughput. Rate Adaptation may select a Modulation and Coding Scheme for a transmission according to information about a channel being used to carry the communication.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (IEEE 802.11n). The IEEE Std 802.11 was subsequently amended by IEEE Std 802.11Ae™-2012, IEEE Std 802.11Aa™-2012, IEEE Std 802.11Ad™-2012, and IEEE Std 802.11Ac™-2013 (IEEE 802.11ac).

Recently, an amendment focused on providing a High Efficiency (HE) WLAN in high-density scenarios is being developed by the IEEE 802.11ax task group. The 802.11ax amendment focuses on improving metrics that reflect user experience, such as average per station throughput, the 5th percentile of per station throughput of a group of stations, and area throughput. Improvements may be made to support environments such as wireless corporate offices, outdoor hotspots, dense residential apartments, and stadiums.

Orthogonal Frequency Division Multiple Access (OFDMA) can be used in wireless networks to enhance the aggregation into a single frame of multiple payloads that are destined to or transmitted from multiple stations. Accordingly, OFDMA technology is now being considered for next generation WLAN technologies, including the 802.11 ax HE WLAN.

An HE WLAN supports Down-Link (DL) and Up-Link (UL) Multi-User (MU) transmissions such as MU OFDMA transmissions and MU Multi-Input-Multi-Output (MU MIMO) transmissions.

In an UL MU transmission, an Access Point (AP) may transmit a frame requiring an immediate response to a plurality of stations, such as a trigger frame or another type of frame. In response, the plurality of stations simultaneously transmit respective UL MU transmission frames, referred to herein as trigger-based frames, to the AP.

In an UL MU OFDMA transmission, the AP schedules which sub-bands (or a group of sub-carriers) each station uses to transmit their payload as part of the UL MU OFDMA transmission to the AP. The allocation of sub-carriers to stations can offer link gain if done judiciously. Particularly, when the AP knows the channel conditions for the group of sub-carriers with respect to each station, then higher throughput may be achieved by allocating a group of sub-carriers with better respective channel conditions to the respective stations, and by avoiding allocating sub-carriers with worse respective channel conditions to the respective stations, where "better" and "worse" are relative to other groups of sub-carriers. The suitability of the respective group of sub-carriers for use by a station is called frequency-selectivity status of the station, and the AP may advantageously acquire frequency-selectivity information for each station by an appropriate means.

One type of process for acquiring frequency-selectivity information exchanges between two wireless devices so that a recipient wireless device that receives a first frame can provide, using a second frame, a transmitting wireless device that transmitted the first frame with channel quality information for each of the subcarriers that the first frame spanned. Such a process is referred to as an explicit process.

Another type of process for acquiring frequency-selectivity information obtains the channel quality information without exchanging additional frames or in fact without inserting additional content to any frame. This may be performed by taking advantage of the reciprocity of the wireless channel when both nodes exchange frames in the same wireless channel, such as may be done in a WLAN operating according to an IEEE 802.11 standard. Such a process is referred to as an implicit process.

When one or more responding stations are scheduled to send respective trigger-based frames as responses to a trigger frame sent by an AP, rate adaptations for the trigger-based frames may be performed by the AP. However, the rate adaptations for the trigger-based frames performed by the AP may not produce as high a data rate or as high a reliability as rate adaptations for the trigger-based frames performed by the respective responding stations would. Furthermore, providing additional information to the AP at least helps to perform the rate adaptation more efficiently. On the other hand, and in particular for an UL MU OFDMA trigger-based frame where the AP is performing the rate adaptations for a large number of responding stations participating in the UL MU OFDMA trigger-based frame, a rate adaptation process may not be scalable. As a result, the AP may not be able to perform the correct rate adaptations for the large number of responding stations.

SUMMARY

In an embodiment, a method implemented by a first wireless device operating in a wireless network for communicating status comprises generating a frame for transmission to a second wireless device operating in the wireless network. Generating the frame includes inserting, by the first wireless device into a Quality of Service (QoS) field of the frame or into a High Throughput (HT) Control field of the frame, buffer status information for multiple traffic identifiers (TIDs). The method further comprises transmitting, by the first wireless device, the frame to the second wireless device in the wireless network.

In an embodiment, generating the frame further includes inserting, by the first wireless device into the QoS field of the frame or into the HT Control field of the frame, an indication as to whether the buffer status information represents all TIDs active between the first wireless device and the second wireless device.

In an embodiment, generating the frame further includes inserting, by the first wireless device into the QoS field of the frame or into the HT Control field of the frame, an indication of access categories represented by the buffer status information.

In an embodiment, generating the frame further includes inserting, by the first wireless device into the HT Control field of the frame, channel quality information (CQI) per one or more resource units of a wireless channel.

In an embodiment, the CQI includes one or more of a preferred modulation and coding scheme, a preferred number of spatial streams, a signal to noise ratio, and a signal to interference and noise ratio.

In an embodiment, generating the frame further includes inserting, by the first wireless device into the HT Control field of the frame, an indication whether the CQI is associated with an uplink transmission or a downlink transmission.

In an embodiment, a resource unit is a continuous set of sub-carriers of a wireless channel assigned for a single transmission in a multiple user transmission.

In an embodiment, generating the frame further includes inserting, by the first wireless device into the HT Control field of the frame, a first indication that the buffer status information describes a combined buffer size for the multiple TIDs on the first wireless device awaiting transmission to the second wireless device.

In an embodiment, generating the frame further includes inserting, by the first wireless device into the HT Control field of the frame, a second indication that indicates units for the combined buffer size.

In an embodiment, generating the frame further includes inserting, by the first wireless device into the HT Control field of the frame, an indication that the buffer status information describes a request for information regarding one or more buffers on the second wireless device.

In an embodiment, the buffer status information includes one or more of a set of TIDs or a set of access categories for which a combined buffer size is requested and units for representing the combined buffer size.

In an embodiment, the HT Control field is a High Efficiency (HE) variant.

In an embodiment, a method implemented by a first wireless device operating in a wireless network for communicating status comprises receiving, by the first wireless device, a frame from a second wireless device operating in the wireless network, and decoding the frame. Decoding the frame includes determining, by the first wireless device using a Quality of Service (QoS) field of the frame or using a High Throughput (HT) Control field of the frame, buffer status information for multiple traffic identifiers (TIDs).

In an embodiment, decoding the frame further includes determining, by the first wireless device using an indication in the QoS field of the frame or in the HT Control field of the frame, whether the buffer status information represents all TIDs active between the second wireless device and the first wireless device.

In an embodiment, decoding the frame further includes determining, by the first wireless device using an indication in the QoS field of the frame or in the HT Control field of the frame, access categories represented by the buffer status information.

In an embodiment, decoding the frame further includes determining, by the first wireless device using the HT Control field of the frame, channel quality information (CQI) per one or more resource units of a wireless channel.

In an embodiment, the CQI includes one or more of a preferred modulation and coding scheme, a preferred number of spatial streams, a signal to noise ratio, and a signal to interference and noise ratio.

In an embodiment, decoding the frame further includes determining, by the first wireless device using an indication in the HT Control field of the frame, whether the CQI is associated with an uplink transmission or a downlink transmission.

In an embodiment, decoding the frame further includes determining, by the first wireless device using a first indication in the HT Control field of the frame, that the buffer status information describes a combined buffer size for the multiple TIDs on the second wireless device awaiting transmission to the first wireless device.

In an embodiment, decoding the frame further includes determining, by the first wireless device using a second indication in the HT Control field of the frame, units for the combined buffer size.

In an embodiment, decoding the frame further includes determining, by the first wireless device using an indication in the HT Control field of the frame, that the buffer status information describes a request for information regarding one or more buffers on the first wireless device. The buffer status information includes one or more of a set of TIDs or a set of access categories for which a combined buffer size is requested and units for representing the combined buffer size.

BRIEF DESCRIPTION OF THE DRAWINGS

FIG. 6 illustrates a High Efficiency (HE) Physical Layer Convergence Procedure (PLCP) Protocol Data Unit (HE PPDU), according to an embodiment.

FIG. 7 shows properties of fields of the frame of FIG. 6, according to an embodiment.

DETAILED DESCRIPTION

Figure 1:
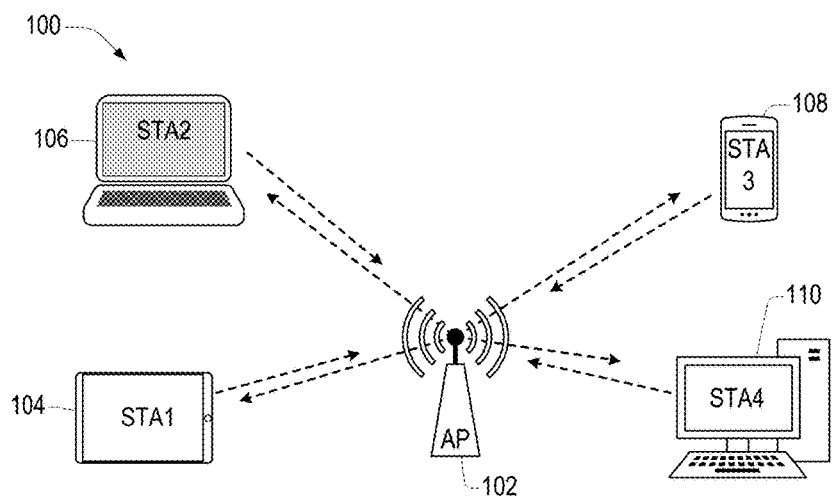
FIG. 1 illustrates a wireless network, according to an embodiment.

The technology described herein relates generally to wireless networking. More particularly, the technology relates to simultaneous communications between stations, including Up-Link (UL) communications, in a wireless network using one or more of a Multi-User (MU) Multi-Input-Multi-Output (MIMO) technology and MU Orthogonal Frequency Division Multiple Access (OFDMA) technology.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an 802.11 wireless LAN (WLAN), the BSS provides the basic organizational unit and typically includes an Access Point (AP) and one or more associated stations (STAs). In FIG. 1, the BSS 100 includes an Access Point 102 (also referred to as the AP) wirelessly communicating with first, second, third, and fourth wireless devices (or stations) 104, 106, 108, and 110 (also referred to as stations STA1, STA2, STA3, and STA4, respectively). The wireless devices may each include a medium access control layer (MAC) and a physical layer (PHY) according to an IEEE 802.11 standard.

Although FIG. 1 shows the BSS 100 including only the first to fourth stations STA1 to STA4, embodiments are not limited thereto and may comprise BSSs including any number of stations.

The AP 102 is a station, that is, a STA, configured to control and coordinate functions of the BSS 100. The AP 102 may transmit information to a single station selected from the plurality of stations STA1 to STA4 in the BSS 100 using a single frame, or may simultaneously transmit information to two or more of the stations STA1 to STA4 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA4 may each transmit data to the AP 102 using a single frame, or transmit information to and receive information from each other using a single frame. Two or more of the stations STA1 to STA4 may simultaneously transmit data to the AP 102 using an Uplink (UL) OFDMA frame. When the BSS 100 supports MU-MIMO, two or more of the stations STA1 to STA4 may simultaneously transmit data to the AP 102 using an UL MU-MIMO frame.

In another embodiment, the AP 102 may be absent and the stations STA1 to STA4 may be in an ad-hoc network.

Each of the stations STA1 to STA4 and the AP 102 includes a processor and a transceiver, and may further include a user interface and a display device.

The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network.

The transceiver may include a single component that performs the functions of transmitting and receiving, or two separate components each performing one of such functions. The processor and transceiver of the stations STA1 to STA4 and the AP 102 may be respectively implemented using hardware components, software components, or both.

The AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may configured able to operate as the AP 102, such as when a cellular phone is configured to operate as a wireless "hot spot."

Each of the stations STA1 to STA4 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but embodiments are not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

A type and subtype of a frame may be identified using a type field and a subtype field included in a control field of the frame, as prescribed in the applicable standard.

Figure 2:
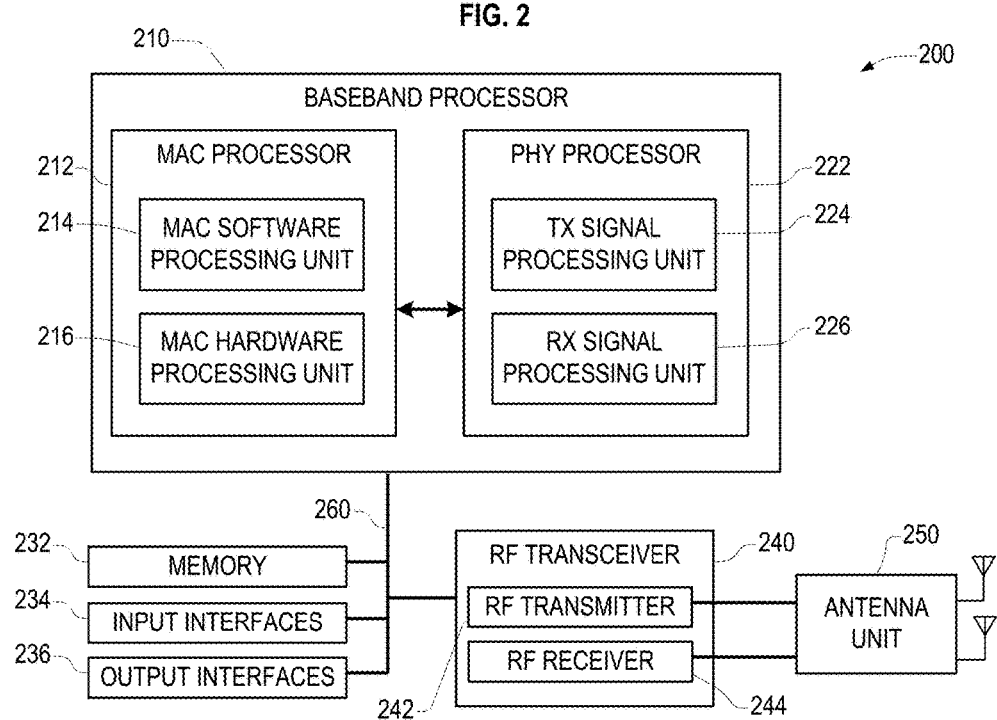
FIG. 2 is a schematic diagram of a wireless device according to an embodiment.

FIG. 2 illustrates a schematic block diagram of a wireless device 200 according to an embodiment. The wireless or WLAN device 200 may be included in the AP 102 or any of the stations STA1 to STA4 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit (SPU) 224 and a receiving SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beam-formed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3A:
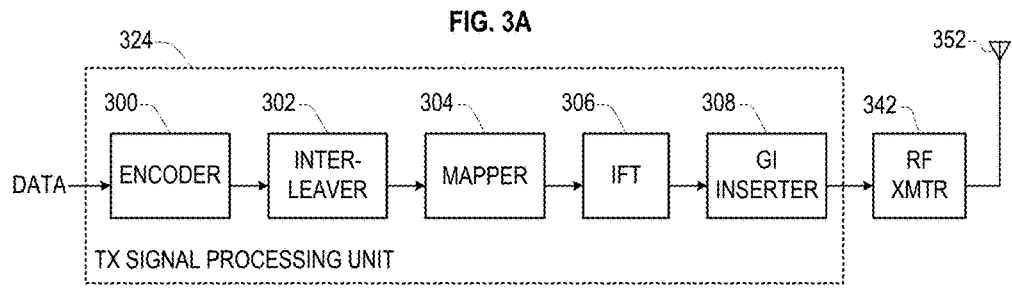
FIG. 3A illustrates components of a wireless device configured to transmit data, according to an embodiment.

FIG. 3A illustrates components of a wireless device configured to transmit data according to an embodiment, including a Transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolutional code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs the BCC encoding, and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to the constellation mapping.

When the TxSP 324 performs a MIMO or MU-MIMO transmission, the TxSP 324 may include a plurality of interleavers 302 and a plurality of mappers 304 according to a number NSS of spatial streams of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number NSTS of space-time streams and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IIFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
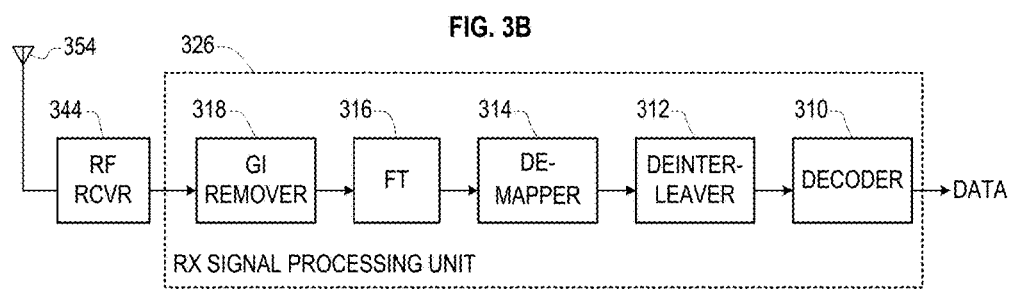
FIG. 3B illustrates components of a wireless device configured to receive data, according to an embodiment.

FIG. 3B illustrates components of a wireless device configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using the LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using the BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 312 includes an FEC decoder. The FEC decoder may include a BCC decoder or an LDPC decoder.

The RxSP 326 may further include a descrambler for descrambling the decoded data. When the decoder 310 performs the BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 200 will assess the availability of the wireless medium using Clear Channel Assessment (CCA). If the medium is occupied, CCA may determine that it is busy, while if the medium is available, CCA determines that it is idle.

Figure 4:
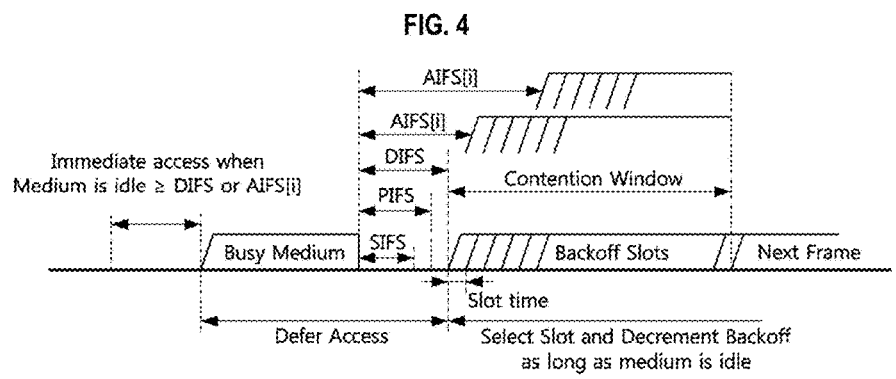
FIG. 4 illustrates Inter-Frame Space (IFS) relationships, according to an embodiment.

FIG. 4 illustrates Inter-Frame Space (IFS) relationships. FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time.

A data frame is used for transmission of data forwarded to a higher layer. The WLAN device transmits the data frame after performing backoff if a DIFS has elapsed during which DIFS the medium has been idle.

A management frame is used for exchanging management information, which is not forwarded to the higher layer. Subtype frames of the management frame include a beacon frame, an association request/response frame, a probe request/response frame, and an authentication request/response frame.

A control frame is used for controlling access to the medium. Subtype frames of the control frame include a request to send (RTS) frame, a clear to send (CTS) frame, and an acknowledgement (ACK) frame.

When the control frame is not a response frame of another frame, the WLAN device transmits the control frame after performing backoff if a DIFS has elapsed during which DIFS the medium has been idle. When the control frame is the response frame of another frame, the WLAN device transmits the control frame after a SIFS has elapsed without performing backoff or checking whether the medium is idle.

A WLAN device that supports a Quality of Service (QoS) functionality (that is, a QoS station) may transmit the frame after performing backoff if an AIFS for an associated access category (AC), (AIFS[AC]), has elapsed. When transmitted by the QoS station, any of the data frame, the management frame, and the control frame which is not the response frame may use the AIFS[AC] of the AC of the transmitted frame.

A WLAN device may perform a backoff procedure when the WLAN device that is ready to transfer a frame finds the medium busy. In addition, a WLAN device operating according to the IEEE 802.11n and 802.11ac standards may perform the backoff procedure when the WLAN device infers that a transmission of a frame by the WLAN device has failed.

The backoff procedure includes determining a random backoff time composed of N backoff slots, each backoff slot having a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device detects no medium activity for the duration of a particular backoff slot, the backoff procedure shall decrement the backoff time by the slot time. When the WLAN determines that the medium is busy during a backoff slot, the backoff procedure is suspended until the medium is again determined to be idle for the duration of a DIFS or EIFS period. The WLAN device may perform transmission or retransmission of the frame when the backoff timer reaches zero.

The backoff procedure operates so that when multiple WLAN devices are deferring and execute the backoff procedure, each WLAN device may select a backoff time using a random function, and the WLAN device selecting the smallest backoff time may win the contention, reducing the probability of a collision.

Figure 5:
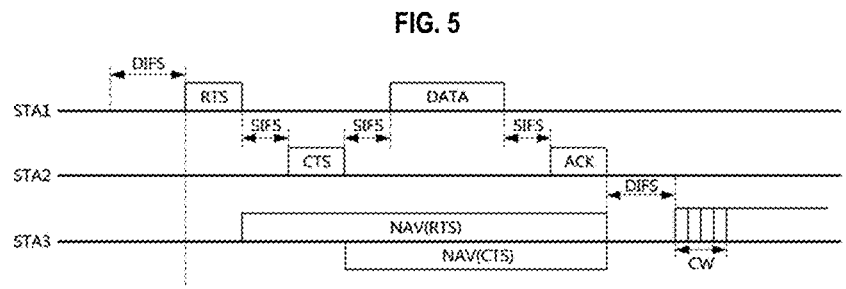
FIG. 5 illustrates a Carrier Sense Multiple Access/Collision Avoidance (CSMA/CA) based frame transmission procedure, according to an embodiment.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1, a frame transmitted from the second station STA2, or both can be received. The stations STA1, STA2, and STA3 may be WLAN devices.

The STA1 may determine whether the channel is busy by carrier sensing. The STA1 may determine the channel occupation based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the STA1 may transmit a Ready-To-Send (RTS) frame to the second station STA2. Upon receiving the RTS frame, after a SIFS the second station STA2 may transmit a Clear-To-Send (CTS) frame as a response of the RTS frame.

When the third station STA3 receives the RTS frame, it may set a NAV timer of the third station STA3 for a transmission duration of subsequently transmitted frames (for example, a duration of SIFS+CTS frame duration+ SIFS+data frame duration+SIFS+ACK frame duration) using duration information included in the RTS frame. When the third station STA3 receives the CTS frame, it may set the NAV timer of the third station STA3 for a transmission duration of subsequently transmitted frames using duration information included in the CTS frame. Upon receiving a new frame before the NAV timer expires, the third station STA3 may update the NAV timer of the third station STA3 by using duration information included in the new frame. The third station STA3 does not attempt to access the channel until the NAV timer expires.

When the STA1 receives the CTS frame from the second station STA2, it may transmit a data frame to the second station STA2 after SIFS elapses from a time when the CTS frame has been completely received. Upon successfully receiving the data frame, the second station STA2 may transmit an ACK frame as a response of the data frame after SIFS elapses.

When the NAV timer expires, the third station STA3 may determine whether the channel is busy using the carrier sensing. Upon determining that the channel is not used by other devices during a DIFS after the NAV timer has expired, the third station STA3 may attempt to access the channel after a contention window according to a backoff process elapses.

The Physical layer (PHY) entity, for a device according to an 802.11 standard, may be based on Orthogonal Frequency Division Multiplexing (OFDM), Orthogonal Frequency Division Multiple Access (OFDMA), or both. In OFDM or OFDMA PHY layers, a station is capable of transmitting and receiving Physical Layer Convergence Procedure (PLCP) Protocol Data Units (PPDUs) that are compliant with a mandatory PHY specification.

In a PHY specification, a set of Modulation and Coding Schemes (MCS) and a maximum number of spatial streams are defined. In some PHY entities, a predetermined maximum number of space-time streams per user and a predetermined maximum number of total space-time streams may be defined for downlink Multi-User (MU) transmissions, uplink MU transmissions, or both.

Some PHY entities define a PPDU that is individually addressed. The identification of the station to which the PPDU is addressed may be based on an Association Identifier (AID) or a Partial AID.

Some PHY entities define a PPDU that is group addressed. The identification of the stations to which the PPDU is addressed may be based on a Group ID (GID).

Some PHY entities provide support for 20 MHz, 40 MHz, 80 MHz and 160 MHz contiguous channel widths and support for an 80+80 MHz non-contiguous channel width. Data subcarriers in the channels may be modulated using one or more of binary phase shift keying (BPSK), quadrature phase shift keying (QPSK), 16-quadrature amplitude modulation (16-QAM), 64-QAM and 256-QAM. Forward error correction (FEC) coding (convolutional or LDPC coding) may be used having coding rates of 1/2, 2/3, 3/4 and 5/6.

In each PHY entity, there would be fields denoted as a Legacy Signal (L-SIG) field, a Signal A (SIG-A) field, and in some cases a Signal B (SIG-B) field, which fields include necessary information regarding attributes of a PLCP Service Data Unit (PSDU). In a receiving station, these fields are decoded first in order to obtain vital information about the PSDU attributes and some MAC attributes. A PSDU may also be referred to as a MAC Protocol Data Unit (MPDU).

The symbols that are used to transmit the L-SIG, SIG-A, and SIG-B fields may be encoded with the most robust MCS available. As a result, the L-SIG, SIG-A, and SIG-B fields include a very limited number of bits, and it is desirable to encode L-SIG, SIG-A, and SIG-B fields in the most compact form possible.

In the IEEE Std 802.11ac, the symbols used to communicate the SIG-A and SIG-B fields are called VHT SIG-A and VHT SIG-B symbols, respectively. In this disclosure, we refer to SIG-A and SIG-B fields of an 802.11ax High Efficiency (HE) communication as HE-SIG-A (or simply SIG-A) and HE-SIG-B (or simply SIG-B) fields, respectively.

FIG. 6 illustrates a High Efficiency (HE) Physical Layer Convergence Procedure (PLCP) Protocol Data Unit (HE PPDU) 600 according to an embodiment. A transmitting station generates the HE PPDU frame 600 and transmits it to one or more receiving stations. The receiving stations receive, detect, and process the HE PPDU frame 600.

The HE PPDU frame 600 includes a Legacy Short Training Field (L-STF) field 602, a Legacy (i.e. a Non-High Throughput (Non-HT)) Long Training Field (L-LTF) 604, a Legacy Signal (L-SIG) field 606, and a Repeated L-SIG field (RL-SIG) 608, which together comprise a legacy preamble. The L-STF 604 of a non-trigger-based PPDU has a periodicity of 0.8 μs with 10 periods.

The HE PPDU frame 600 also includes an HE-SIG-A field 610, an optional HE-SIG-B field 612, an HE-STF 614, an HE-LTF 616, and an HE-Data field 618.

The legacy preamble, the HE-SIG-A field 610, and the HE-SIG-B field 612 when present, comprise a first part of the HE PPDU frame 600. The first part of the HE PPDU frame 600 may be decoded using a 64 element Discrete Fourier Transform (DFT), having a basic sub-carrier spacing of 312.5 KHz.

The HE-SIG-A field 610 is duplicated on each 20 MHz segment after the legacy preamble to indicate common control information. The HE-SIG-A field 610 includes a plurality of OFDM HE-SIG-A symbols 620 each having a duration including a Guard Interval (GI) of 4 μs. A number of the HE-SIG-A symbols 620 in the HE-SIG-A field 610 is indicated by $N_{HESIGA}$ and is either 2 or 4.

The HE-SIG-B field 612 is included in Down-Link (DL) Multi-User (MU) PPDUs. The HE-SIG-B field 612 includes a plurality of OFDM HE-SIG-B symbols 622 each having a duration including a Guard Interval (GI) of 4 μs. Single User (SU) PPDUs and Up-Link (UL) MU PPDUs do not contain the HE-SIG-B field 612. A number of the HE-SIG-B symbols 622 in the HE-SIG-B field 612 is indicated by $N_{HESIGB}$ and is variable.

An HE-STF 614 of a non-trigger-based PPDU has a periodicity of 0.8 μs with 5 periods. A non-trigger-based PPDU is a PPDU that is not sent in response to a trigger frame. An HE-STF 614 of a trigger-based PPDU has a periodicity of 1.6 μs with 5 periods. A trigger-based PPDU is an UL PPDU sent in response to a trigger frame.

The HE-LTF 616 includes one or more OFDM HE-LTF symbols 626 each having a duration of 12.8 μs plus a Guard Interval (GI). The HE PPDU frame 600 may support a 2×LTF mode and a 4×LTF mode. In the 2×LTF mode, an HE-LTF symbol 626 excluding a Guard Interval (GI) is equivalent to modulating every other tone in an OFDM symbol of 12.8 μs excluding the GI, and then removing the second half of the OFDM symbol in a time domain. A number of the HE-LTF symbols 626 in the HE-LTF field 616 is indicated by $N_{HELTF}$, and is equal to 1, 2, 4, 6, or 8.

The HE-Data field 618 includes one or more OFDM HE-Data symbols 628 each having a duration of 12.8 μs plus a Guard Interval (GI). A number of the HE-Data symbols 628 in the HE-Data field 618 is indicated by $N_{DATA}$ and is variable.

FIG. 7 shows a Table 1 indicating additional properties of the fields of the HE PPDU frame 600 of FIG. 6, according to an embodiment.

In the below description, for sake of completeness and brevity, we refer to OFDMA-based 802.11 technology and by a station we refer to a non-AP HE STA and by AP we refer to an HE AP.

Figure 8:
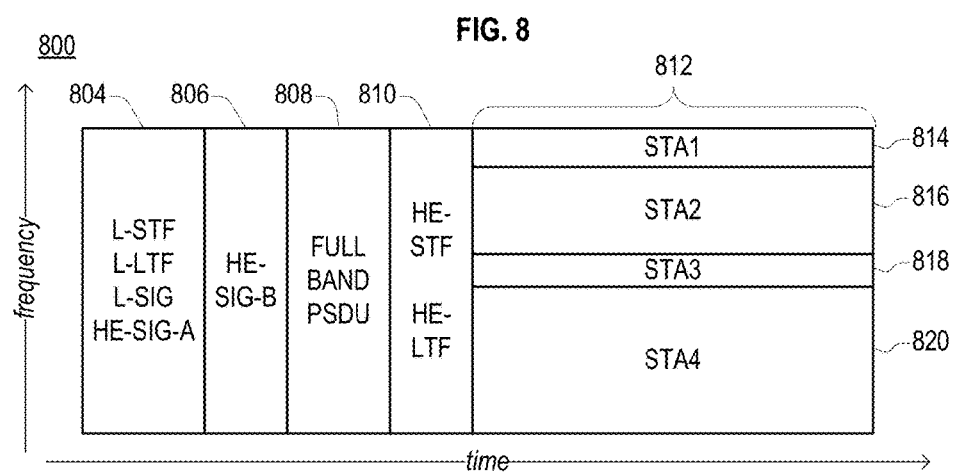
FIG. 8 illustrates a DL MU OFDMA PPDU, according to an embodiment.

FIG. 8 illustrates a DL MU OFDMA PPDU 800 being transmitted to a set of stations including first, second, third, and fourth stations STA1, STA2, STA3, and STA4. The concepts described herein with respect to DL OFDMA frame 800 also apply to UL OFDMA frames unless specifically stated otherwise. The bandwidth of the DL OFDMA frame 800 may be 20, 40, 80, 160, or 80+80 MHz.

In FIG. 8, a horizontal dimension is a time dimension or number of OFDM symbols, and a vertical dimension is a frequency dimension, or a number of tones or subcarriers. Note that for a given Fourier Transform (FT) size, the number of tones is a fixed value; however, depending on the subcarrier spacing, two OFDM symbols with, for example, respective FT sizes of 64 and 256 may occupy the same bandwidth.

Hereinafter, the term sub-band refers to a set of contiguous tones or subcarriers that as a whole are assigned for a payload whose expected destination is a single station, or a set of stations. A set of sub-bands or a set of sub-carriers may also be referred to as a Resource Unit (RU). A sub-band is represented in FIG. 8 as a horizontal partition of the DL OFDMA PPDU 800 where a set of contiguous tones for a contiguous set of OFDM symbols are designated for a given payload whose expected destination is a station or a set of stations. The bandwidth assigned to payloads of the stations STA1 to STA4 depend on the respective payload sizes, MCS, and numbers of spatial streams that the AP determines for the respective sub-band transmissions, and the overall consideration that the AP needs to make to align the length or duration of various PSDU sub-bands.

The DL OFDMA PPDU 800 includes a first portion 804 including an L-STF, an L-LTF, an L-SIG field based on IEEE Std 802.11n and 802.11ac. The symbols in these fields make the DL OFDMA PPDU 800 compatible with legacy designs and products.

The L-STF, L-LTF, and L-SIG symbols of the first portion 804 are modulated using a Fourier Transform (FT) size of 64 on a 20 MHz channel and are duplicated within each 20 MHz channel of the DL OFDMA PPDU 800 when the DL OFDMA PPDU 800 has a bandwidth wider than 20 MHz.

The first portion 804 also includes an HE-SIG-A field. The symbols of the HE-SIG-A field may carry necessary information regarding each PSDU and regarding the RF, PHY, and MAC properties of the DL OFDMA PPDU 800.

The DL OFDMA PPDU 800 includes an HE-SIG-B field 806. The symbols of the HE-SIG-B field 806 may carry necessary information regarding each PSDU and regarding the RF, PHY, and MAC properties of the DL OFDMA PPDU 800. In an embodiment, the HE-SIG-B field 806 may not always be present in all DL OFDM PPDUs and is not present in UL OFDMA PPDUs.

In an embodiment, the HE SIG-A field of the first portion 804 and HE-SIG-B field 806 may be modulated using an FT size of 64. In another embodiment, the HE SIG-A field of the first portion 804 and HE-SIG-B field 806 may be modulated using an FT size of 256. In another embodiment, the HE SIG-A field of the first portion 804 may be modulated using an FT size of 64 and the HE-SIG-B field 806 may be modulated using an FT size of 256.

In this disclosure, several fields are proposed to be located either in the HE-SIG-A field of the first portion 804, in the HE-SIG-B field 806, or in both.

The DL OFDMA PPDU 800 includes HE-STF and HE-LTF symbols in a second portion 810. The HE-STF and HE-LTF symbols are used to perform necessary RF and PHY processing for each PSDU in the DL OFDMA PPDU 800, for the whole DL OFDMA PPDU 800, or both. Depending on whether the HE-STF and HE-LTF symbols in the second portion 810 are beamformed or not, there might be two or more sets of such symbols.

In an embodiment, the DL OFDMA PPDU 800 may include a full-band transmission region 808 for unicast or broadcast/multicast full-band PSDU(s). The full-band transmission region 808 may be an optional region in a DL OFDMA PPDU 800 and may have a variable length. The full-band transmission region 808 includes one or more sequential symbols that each covers the whole bandwidth of the DL OFDMA PPDU 800 and that occur before the start of a MU payload region 812. The full-band transmission region 808 may not be present in an UL OFDMA PPDU. Further details are given below.

When the full-band transmission region 808 is present in the DL OFDMA PPDU 800, there may be a set of HE-STF and/or HE-LTF symbols that immediately precede the full-band PSDUs included in the full-band transmission region 808, where the set of HE-STF and/or HE-LTF symbols are not beamformed. The one or more full-band PSDUs in the full-band transmission region 808 could be carried with FT size=64 or FT size=256 according to a design choice to have the full-band PSDUs in the full-band transmission region 808 carried with FT size=64 as the HE-SIG-A field is or carried with FT size=256 as the MU payload region 812 is.

The DL OFDMA PPDU 800 includes the MU payload region 812. The MU payload region 812 includes first, second, third, and fourth unicast PSDUs 814, 816, 818, and 820 intended for the first, second, third, and fourth stations STA1, STA2, STA3, and STA4, respectively. Each unicast PSDU 814, 816, 818, and 820 contains a respective payload that is destined to the respective stations STA1, STA2, STA3, and STA4 plus necessary MAC padding and PHY padding. The unicast PSDU 814, 816, 818, and 820 are sub-band PSDUs.

The unicast PSDUs 814, 816, 818, and 820 are destined to respective stations that are associated with the AP. The presence and length of unicast PSDUs 814, 816, 818, and 820 in respective one or more sub-bands and the respective station that is the recipient of the unicast PSDU 814, 816, 818, and 820 may be indicated in the HE SIG-A field, the HE-SIG-B field, or both.

One or more Broadcast full-band PSDUs may be located in the full-band transmission region 808 and destined to all the stations that are associated with the AP. The presence and length of the Broadcast full-band PSDUs may be indicated in the HE SIG-A field, the HE-SIG-B field, or both.

One or more Multicast full-band PSDUs may be located in the full-band transmission region 808 and destined to a set of stations that are associated with the AP. The presence and length of the Multicast full-band PSDUs may be indicated in the HE SIG-A field, the HE-SIG-B field, or both.

One or more unicast full-band PSDUs may be located in the full-band PSDU region. The presence and length of the one or more unicast full-band PSDUs and the respective station that is the recipient of the one or more unicast full-band PSDUs may be indicated in the HE SIG-A field, the HE-SIG-B field, or both.

Embodiments of the present disclosure include a (possibly optional and variable-length) full-band PSDU or full-band transmission that covers the whole bandwidth across several symbols, before the start of the sub-band transmission.

Embodiments include several fields that may be located in a HE-SIG-A field, a HE-SIG-B field, or both.

Each PSDU, whether full-band or sub-band, contains the payload that is destined to a station, or to several stations, plus the necessary MAC padding and PHY padding.

Figure 9:
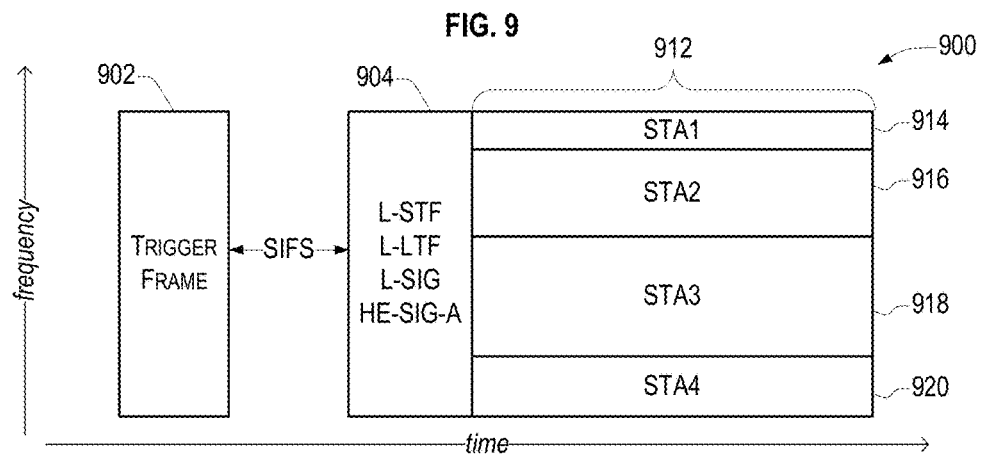
FIG. 9 illustrates an UL MU OFMDA communication according to an embodiment.

FIG. 9 illustrates an UL MU communication exchange according to an embodiment. The sequence includes an UL MU PPDU 900 and a trigger frame 902. The UL MU PPDU 900 may employ OFDMA, MU MIMO, or any combination thereof.

An AP initiates the UL MU communication by sending the trigger frame 902 to a plurality of stations (here, first to fourth stations STA1 to STA4) associated with the AP. The trigger frame may also be referred to as an UL-Poll frame.

The trigger frame 902 provides the stations participating in the UL MU communication with a time and frequency reference relative to the AP. The trigger frame 902 also includes information regarding i) the stations that are expected to participate in the UL MU communication, ii) the respective bandwidth and sub-bands that the stations are to use when performing the UL MU communication, and iii) one or more PHY and MAC attributes that the stations shall follow.

An IFS interval (such as a SIFS) after the transmission of the last symbol of a PPDU including the trigger frame 902, the stations designated in the trigger frame 902 may simultaneously send their respective UL OFDMA frames (which frames are trigger-based frames) which air-combine (i.e., radio-frequency (RF) combined) to form the UL MU PPDU 900.

The UL MU PPDU 900 includes a first portion 904 including an L-STF, an L-LTF, and an L-SIG field based on IEEE Std 802.11n and 802.11ac. The symbols in these fields make the UL MU PPDU 900 compatible with legacy designs and products.

The L-STF, L-LTF, and L-SIG symbols of the first portion 904 are modulated using a Fourier Transform (FT) size of 64 on a 20 MHz channel and are duplicated within each 20 MHz channel of the UL MU PPDU 900 when the UL MU PPDU 900 has a bandwidth wider than 20 MHz.

The first portion 804 also includes an HE-SIG-A field. The symbols of the HE-SIG-A field may carry necessary information regarding each PSDU and regarding the RF, PHY, and MAC properties of the UL MU PPDU 900.

In an embodiment, the HE SIG-A field of the first portion 904 may be modulated using an FT size of 64. In another embodiment, the HE SIG-A field of the first portion 804 may be modulated using an FT size of 256.

The UL MU PPDU 900 includes an MU payload region 912. The MU payload region 812 includes first, second, third, and fourth PSDUs 914, 916, 918, and 920 transmitted by the first, second, third, and fourth stations STA1, STA2, STA3, and STA4, respectively. Each PSDU 914, 916, 918, and 920 contains a respective payload from the respective station STA1, STA2, STA3, and STA4 plus necessary MAC padding and PHY padding. The PSDUs 914, 916, 918, and 920 are sub-band PSDUs.

Figure 10:
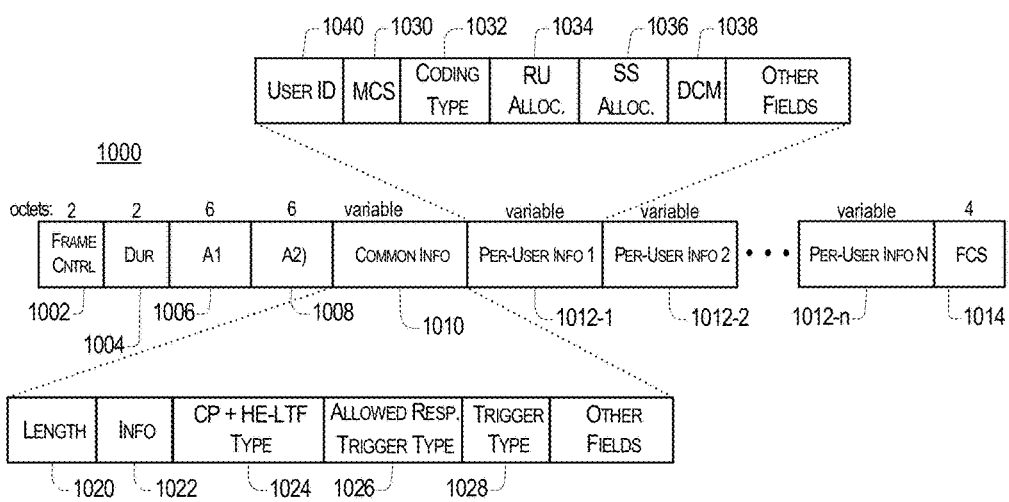
FIG. 10 illustrates a trigger frame according to an embodiment.

FIG. 10 illustrates a structure of a trigger frame 1000 according to an embodiment. The trigger frame includes a Frame Control field 1002, a Duration field 1004, an Address 1 (A1) field 1006, an Address 2 (A2) field 1008, a Common Info field 1010, a plurality of Per-User Info fields 1012-1, 1012-2, ... 1012-$n$ (where n is the number of Per-User Info fields), and a Frame Check-Sum field 1014. In an embodiment, n is equal to a number of stations participating in a UL MU PPDU transmission performed in response to the trigger frame 1000.

The Frame Control field 1002 and Duration field 1004 each include two octets. The FCS field includes four octets. The A1 field 1006 and A2 field 1008 each include six octets. The Common Info field 1010 and Per-User Info fields 1012-1, 1012-2 ... 1012-$n$ have respective variable numbers of octets, that is, each may have a respective variable length.

The Common Info field 1010 includes information corresponding to general attributes of a UL MU PPDU applicable to all participating stations that will be transmitted in response to the trigger frame 1000 (that is, a response UL MU PPDU). The Per-User Info fields 1012-1, 1012-2 ... 1012-$n$, include information corresponding to attributes of PSDUs of respective stations participating in the UL MU PPDU transmission. The Per-User Info fields may be referred to as "STA PSDU attributes." In an embodiment, the trigger frame 1000 includes a Per-User Info field 1012-1, 1012-2 ... 1012-$n$ for each station scheduled to participate in the UL MU PPDU transmission. The Common Info field 1010 and the Per-User Info fields 1012-1, 1012-2 ... 1012-$n$ may each include other fields besides the fields described for each herein.

The Common Info field 1010 may include a Length field 1020. The Length field 1020 may include 12 bits. A value of the Length field 1020 may be equal to a value of a Length field of an L-SIG field of the response UL MU PPDU. A responding station will copy the value of the Length field 1020 into an L-SIG length field of the trigger-based frame it transmits, hence the encoding shall be the same as defined for the L-SIG Length of the UL MU PPDU.

The Common Info field 1010 may include an Info field 1022 including content of a SIG-A field of the response UL MU PPDU. In an embodiment, the Info field 1022 excludes one or more bits of the SIG-A field of the response UL MU PPDU when the one or more bits are implicitly known by all of the responding stations. That is, the Info field 1022 may only include information on bits of the SIG-A field of the response UL MU PPDU that the responding stations rely on the Info field 1022 to determine.

The Common Info field 1010 may include a Cyclic Prefix (CP)+HE-LTF type field 1024 that specifies a CP duration (such as 0.8, 1.6, or 3.2 μs) and a type of HE-LTF (such as a 4xLTF or 2xLTF) to use in the response UL MU PPDU.

The Common Info field 1010 may include an Allowed Response Type/Trigger type field 1026 and a Trigger Type field 1028. For instance, a Trigger frame might indicate that the type of responses expected are one of Buffer Status Reports, CTS frames, Block Acknowledgment (BA) frames, etc. The responding STAs send the frames that contain the type of response expected by the sender of the Trigger frame. When a specific Trigger Type is indicated in the Common Info field, there might be additional sub-fields within the Common Info field to further specify some of the details of the requested response type.

Each Per-User Info field 1012-1, 1012-2 ... 1012-$n$ may include an MCS field 1030 that includes four bits, a Coding type field 1032, Resource Unit (RU) allocation information 1034, Spatial Stream (SS or NSS) allocation information 1036, a Dual Subcarrier Modulations (DCM) field 1038 that includes one bit, and a User Identifier (User ID) field 1040 that includes twelve bits. The User ID field 1040 may include an Association ID for a station associated with the AP. When a specific Trigger Type is indicated in the Common Info field, there might be additional sub-fields within each Per-User Info field to further specify some of the details of the requested response type.

Among the opportunities that are provided by DL OFDMA is frequency selectivity gain, where an AP would allocate resources to each station where those allocated resources offer highest frequency-gain for that station. This disclosure offers a new PS-Poll procedure through which the AP can obtain the information that is needed to harvest frequency selectivity gain for each STA in the subsequent DL or UL OFDMA frames. The procedures described in this disclosure send no additional frame to obtain the subcarrier information. Hence, the procedure described here is an implicit method where the AP, or any OFDMA transmitting node, exploits the existing procedures and the wireless channel reciprocity to obtain the subcarrier information needed for upcoming OFDMA frames.

For UL MU OFDMA or UL MU MIMO operations, one challenge is communicating status information of a station participating in the UL operation, such as a buffer status or a frequency-selectivity state, to the AP. The AP may use the status information of the stations to, for example, assign sub-bands of the UL OFDMA transmission to each station, and in particular to assign sub-bands to each station that performs better, for that station, than other sub-bands.

Figure 11:
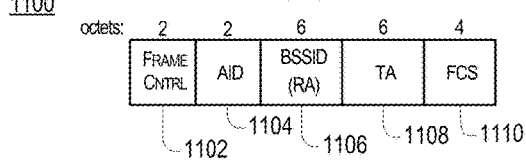
FIG. 11 illustrates a Power Save (PS) Poll frame, according to an embodiment.

FIG. 11 illustrates a Power Save Poll (PS-Poll) frame 1100. The PS-Poll frame 1100 is a control frame according to the IEEE 802.11 specification. The PS-Poll frame 1100 may be sent by stations that are out of a Power Save (PS) mode in order to determine whether the AP associated with the station has any pending DL data for them.

The PS-Poll frame 1100 includes a Frame Control field 1102, an Association Identifier (AID) field 1104, a BSS Identifier ID (BSSID) or Receiver Address (RA) field 1106, a Transmitter Address (TA) field 1108, and a Frame Check Sum (FCS) field 1110.

The BSSID field 1106 includes an address of a station contained in the AP. The TA field 1108 includes an address of the station transmitting the frame. The AID field 1104 includes a value assigned to the station transmitting the frame by the AP in the association response frame corresponding to the station's current association.

In an embodiment, the AP and stations associated with the AP use the PS-Poll frame 1100 and the associated procedures from the IEEE 802.11 specification to provide the AP with sub-band information over the largest bandwidth that both the AP and the respective stations operate and that the condition of the wireless medium allows.

In 802.11 specifications, when a station exits a power save mode, the stations sends the PS-Poll frame 1100 to the AP to determine whether there is a DL payload waiting for the station. The AP acknowledges the reception of the PS-Poll frame 1100 and subsequently sends the DL payload to the station.

Figure 12:
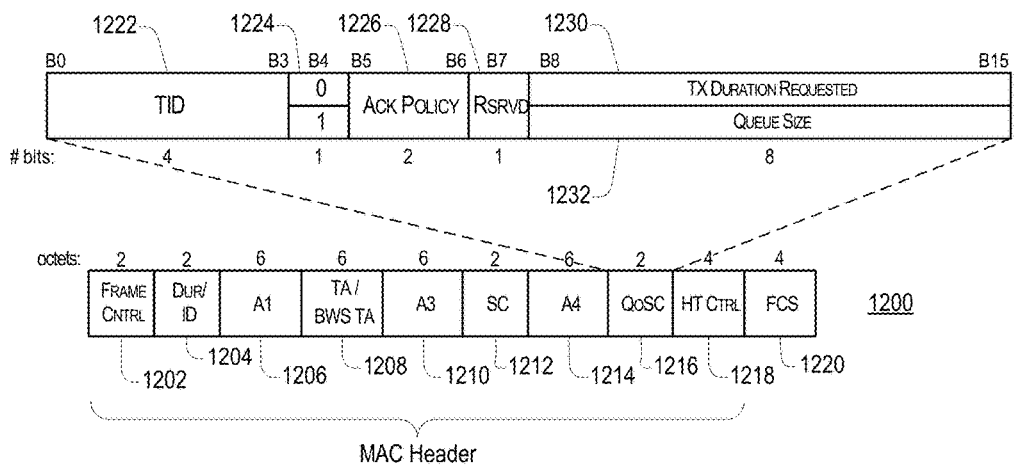
FIG. 12 illustrates a Quality of Service (QoS) Null frame, according to an embodiment.

FIG. 12 illustrates a Quality of Service (QoS) Null frame 1200 according to an embodiment. The QoS Null frame 1200 may be sent by a non-AP station (STA). The QoS Null frame 1200 may also be referred to as a "QoS Null (no data)" frame. The QoS Null frame 1200 includes a MAC header but it does not includes a payload, that is, the payload size is zero and an FCS field 1220 follows immediately after the MAC header. The QoS Null data frame 1200 is used for MAC control purposes.

The MAC header of the QoS Null frame 1200 includes a Frame Control field 1202, a Duration/ID field 1204, a Sequence Control field 1212, a QoS Control field 1216, a HT Control field 1218, a transmitting station Address (TA) field 1208, and Address 1 (A1), Address 3 (A3), and Address 4 (A4) fields 1206, 1210, and 1214.

While the QoS Null frame 1200 does not have a payload, the MAC header of the QoS Null frame 1200 includes the QoS Control field 1216. The QoS Control field 1216 includes a Traffic ID (TID) field 1222, and an ACK Policy field 1226. When a fifth bit (B4) 1224 of the QoS Control field 1216 has a value of zero, a last 8 bits (B8 to B15) of the QoS Control field 1216 are used as a Transmission Opportunity (TXOP) Duration Requested field 1230. When the fifth bit 1224 has a value of one, the last 8 bits of the QoS Control field 1216 are used as a Queue Size field 1232.

The Queue Size field 1232 includes an 8-bit Queue Size value that indicates an amount of buffered traffic for a given Traffic Category (TC) or Traffic Stream (TS) of the station sending the QoS Null frame 1200. The Queue Size subfield 1232 is present in QoS data frames sent by non-AP STAs with the fifth bit (B4) 1224 of the QoS Control field 1216 equal to 1. The AP may use information contained in the Queue Size subfield 1232 to determine a TXOP duration assigned to the station.

The Queue Size value is a size, rounded up to the nearest multiple of 256 octets and expressed in units of 256 octets, of MAC Service Data Units (MSDUs) and Aggregate MSDUs (A-MSDUs) buffered at the STA. Specifically, the Queue size is a total size of MSDUs and A-MSDUs in a delivery queue used for MSDUs and A-MSDUs with TID values equal to the value in the TID subfield 1222 of the QoS Control field 1216. A size of the MSDU or A-MSDU of the present QoS data frame is not included in the Queue Size value.

A Queue Size value of 0 is used solely to indicate the absence of any buffered traffic in the queue used for the specified TID. A Queue Size value of 254 is used for all sizes greater than 64768 octets. A Queue Size value of 255 is used to indicate an unspecified or unknown size. If a QoS data frame is fragmented, the Queue Size value may remain constant in all fragments even if the amount of queued traffic changes as successive fragments are transmitted.

In an embodiments, the Queue Size value indicates the total size of all queues for all Access Categories (AC), which is equivalent to the queue size for all TIDs. In such a case, the TID field 1222 of QoS Control field 1216 is reserved.

To indicate that the Queue Size value indicates the total size of all queues for all Access Categories (AC) or all TIDs, the eighth bit 1228 (B7) of the QoS Control field 1216 of the QoS Null frame 1200 or the QoS data frame is set to 0. The Queue Size value is the total size, rounded up to the nearest multiple of a first size (such as 256 octets) and expressed in units of the first size, of all MSDUs and A-MSDUs buffered at the station (excluding the MSDU or A-MSDU of the frame containing the QoS data frame) in the delivery queue used for MSDUs and A-MSDUs with any TID value.

In another embodiment, the eighth bit 1228 (B7) of the QoS Control field of the QoS Control field 1216 of the QoS Null frame 1200 is set to 1 to indicate that the Queue size is the queue size for a given access category (AC). In this case, the queue size value is the total size, rounded up to the nearest multiple of a second size (such as 256 octets) and expressed in units of the second size, of all MSDUs and A-MSDUs buffered at the STA in the delivery queue used for MSDUs and A-MSDUs with the given AC. The given AC is the AC of the TID that is indicated in the TID field 1222 of the QoS Control field 1216. A size of the MSDU or A-MSDU of the present QoS data frame is not included in the Queue Size value.

For example, if the TID value in the TID field 1222 is associated with AC VO, then the queue size is the total queue size for all the TIDs that are associated with AC VO. If the TID value is associated with AC VI, then the queue size is the total queue size for all the TIDs that are associated with AC VI, and so on.

In some embodiments, the eighth bit 1228 (B7) of the QoS Control field 1216 of the QoS Null frame 1200 or the QoS data frame is set to 1 to indicate that the Queue Size value in the Queue Size subfield 1232 is the queue size for a given TID whose value is indicated in Bits 0-3 of the QoS Control field 1216.

In an embodiment, one of the above embodiments might be used in some frames, and another embodiment might be used in on or more other frames.

In an embodiment, the first size and the second size have different values.

In embodiments related to QoS Null frames disclosed herein, a station takes advantage of a QoS Null frame and an associated procedure to indicate to the AP that the station is associated with scheduling-related information. The scheduling-related information may include one or more of buffer status and sub-band information over the largest bandwidth that both AP and STA can operate and the condition of the wireless medium allows. The AP may use the scheduling-related information to schedule an UL OFDMA PPDU or an UL MU MIMO PPDU among several stations.

In embodiments, each of a plurality of stations associated with an AP sends a QoS Null frame to the AP. In the QoS Null frame, a fifth bit B4 of the QoS Control field is set to 1, indicating that Bits 8-16 are Buffer Size values, and an eighth bit B7 is i) set to 0 to indicate that the Queue Size is for all ACs combined (or equivalently all TIDs combined), or ii) set to 1 to indicate that the Queue Size is only for a given AC.

Figure 13:
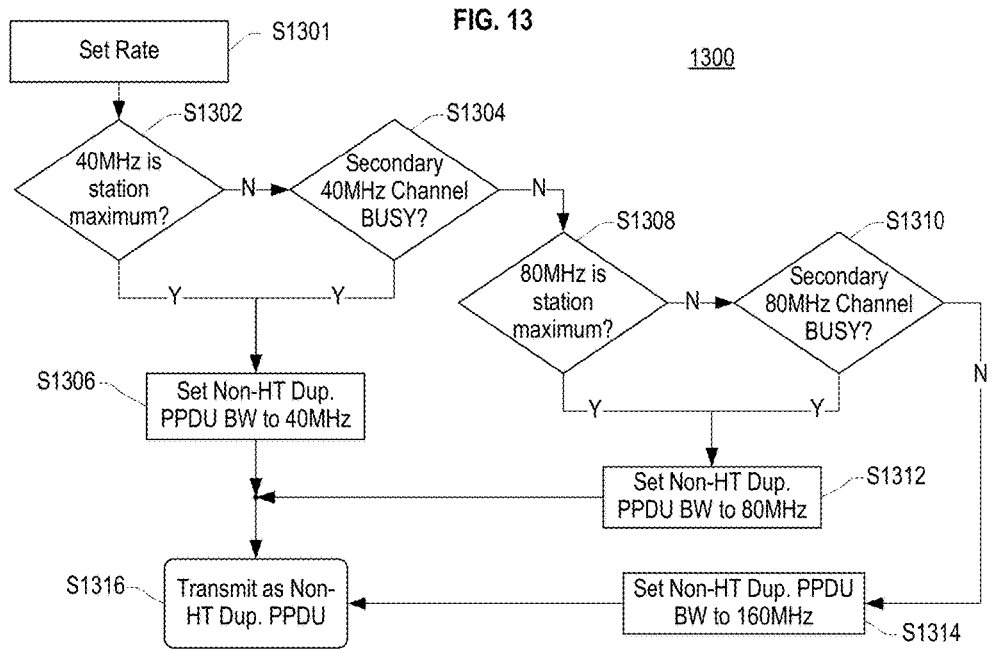
FIG. 13 illustrates a process for determining a rate and bandwidth of a non-HT duplicate PPDU, according to an embodiment.

FIG. 13 illustrates a process 1300 performed by a station for determining a rate and bandwidth of a non-HT duplicate PPDU, according to an embodiment. The bandwidth may correspond to a CH_BANDWIDTH_IN_NON_HT parameter of a TXVECTOR.

At S1301, the process 1300 determines a rate for transmitting the QoS Null frame. The QoS Null frame shall be transmitted by the station using a rate no higher than the highest rate in the BSSBasicRateSet parameter that is less than or equal to the rate or non-HT reference rate of a previously transmitted frame that was directed to the station. When no rate in the BSSBasicRateSet parameter meets these conditions, the QoS Null frame shall be transmitted at a rate no higher than the highest mandatory rate of the applicable standard for the attached PHY that is less than or equal to the rate or non-HT reference rate of the previously transmitted frame that was directed to the station.

When a secondary 20 MHz channel is not BUSY, the station may transmit the QoS Null frame using a non-HT duplicate PPDU having i) a bandwidth determined according to the process 1300, and ii) contents of the primary 20 MHz channel duplicated in each other 20 MHz channel. Otherwise, the station may transmit the QoS Null frame using a Non-HT PPDU using only the primary 20 MHz channel.

At S1302, the process 1300 determines whether a maximum bandwidth that the station is capable of operating at (i.e. the bandwidth at the time that the STA associated with the AP or a narrower bandwidth that is announced in an Operating Mode Notification sent by the STA or the AP) is 40 MHz. That is, whether both the AP and the station may not operate at a bandwidth wider than 40 MHz. When the maximum bandwidth is 40 MHz, the process 1300 proceeds to S1306. When both the AP and the station may operate at a bandwidth wider than 40 MHz, the process 1300 proceeds to S1304.

At S1304, the process 1300 determines whether a secondary 40 MHz channel is sensed as BUSY by the station at a PIFS time before transmission of the QoS Null frame. When the secondary 40 MHz channel is sensed as BUSY, the process 1300 proceeds to S1306. Otherwise, at S1304 the process 1300 proceeds to S1308.

At S1306, the process 1300 sets the non-HT duplicate PPDU bandwidth (that is, the CH_BANDWIDTH_IN_NON_HT parameter of the TXVECTOR) to indicate 40 MHz. The process 1300 then proceeds to S1316.

At S1308, the process 1300 determines whether the maximum bandwidth that the station is capable of operating at is 80 MHz; that is, whether both the AP and the station may not operate at a bandwidth wider than 80 MHz. When the maximum bandwidth is 80 MHz, the process 1300 proceeds to S1312. When both the AP and the station may operate at a bandwidth wider than 80 MHz, at S1308 the process 1300 proceeds to S1310.

At S1310, the process 1300 determines whether a secondary 80 MHz channel is sensed as BUSY by the station at a PIFS time before transmission of the QoS Null frame. When the secondary 80 MHz channel is sensed as BUSY, the process 1300 proceeds to S1312. Otherwise, at S1310 the process 1300 proceeds to S1314.

At S1312, the process 1300 sets the CH_BANDWIDTH_IN_NON_HT parameter of the TXVECTOR to indicate 80 MHz. The process 1300 then proceeds to S1316.

At S1314, the process 1300 sets the CH_BANDWIDTH_IN_NON_HT parameter of the TXVECTOR to indicate 80+80 or 160 MHz. The process 1300 then proceeds to S1316.

At S1316, the process 1300 transmits the QoS Null frame as a Non-HT Duplicate Frame having a bandwidth indicated in the CH_BANDWIDTH_IN_NON_HT parameter of the TXVECTOR. The TA field 1208 of the QoS Null frame may include an address of the station transmitting the frame or may include a value indicating a bandwidth (that is, the TA field 1208 may be a bandwidth signaling (BWS) TA field).

In the QoS Null frame transmitted by a VHT or HE STA in a non-HT format or non-HT duplicate format and wherein a scrambling sequence carries the TXVECTOR parameter CH_BANDWIDTH_IN_NON_HT (such as the cases described above), the TA field 1208 may be a bandwidth signaling TA.

Figure 14:
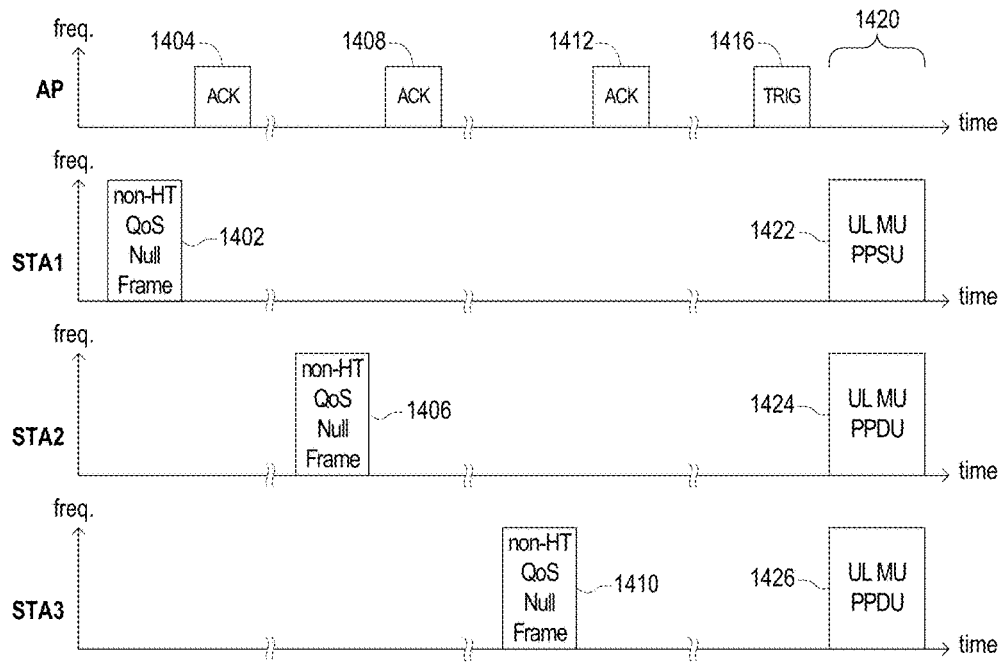
FIG. 14 illustrates a process incorporating QoS Null frames having bandwidths determined according to the process of FIG. 13, according to an embodiment.

FIG. 14 illustrates a process 1400 incorporating QoS Null frames having bandwidths determined according to the process 1300 of FIG. 13, according to an embodiment. In the example shown in FIG. 14, the QoS Null frames are in non-HT duplicate formats and are transmitted using a bandwidth wider than 20 MHz.

In the example of FIG. 14, first, second, and third stations STA1, STA2, and STA3 respectively set CH_BANDWIDTH_IN_NON_HT parameters of TXVECTORs to indicate 40 MHz, 80 MHz, 80+80 MHz, or 160 MHz according to the process 1300 of FIG. 13. As a result, each of the stations STA1, STA2, and STA3 may send respective QoS Null frames 1402, 1406, and 1410 with a full operational bandwidth of the BSS or with a narrower bandwidth than the full operational bandwidth of the BSS. The QoS Null frames 1402, 1406, and 1410 include Queue Size information of the respective stations STA1, STA2, and STA3.

The sequence of transmission of the QoS Null frames 1402, 1406, and 1410 does not necessarily happen after each other as shown in FIG. 14, and time may elapse between the transmission of each of the QoS Null frames 1402, 1406, and 1410.

The AP may determine respective frequency selectivity information for the stations STA1, STA2, and STA3 using the respective QoS Null frames 1402, 1406, and 1410, and may determine respective queue size information for stations STA1, STA2, and STA3 according to the Queue Size information included in the respective QoS Null frames 1402, 1406, and 1410. The AP may respond to the QoS Null frames 1402, 1406, and 1410 by transmitting respective ACK frames 1404, 1408, and 1412.

Each QoS Null frame 1402, 1406, and 1410 still provides the AP with full information about the Queue Sizes of the respective stations STA1, STA2, and STA3 even when transmitted using the narrower bandwidth.

However, any of the QoS Null frame 1402, 1406, and 1410 that is transmitted using the narrower bandwidth may not allow the AP to determine all of the frequency selectivity information of the respective transmitting station. In an embodiment, that AP may use previously determined frequency selectivity information for a given station when the AP receives a QoS Null frame with narrower bandwidth than the full bandwidth of the BSS from the station.

The AP may perform resource allocation according to the frequency selectivity information and queue size information obtained using the QoS Null frame 1402, 1406, and 1410. The AP may communicate information regarding the resource allocation to the STA1, STA2, and STA3 using a frame 1416 that includes trigger information.

The stations STA1, STA2, and STA3 perform an UL MU transmission 1420 according to the resource allocation information communicated in the frame 1416. The UL MU transmission 1420 includes UL MU PSDUs 1422, 1424, and 1426 respectively transmitted by the stations STA1, STA2, and STA3 using resources that the resource allocation information indicates the respective stations STA1, STA2, and STA3 have been allocated or are permitted to use.

For the QoS Null transmissions of FIGS. 13 and 14, a station may perform channel sensing generally according to the procedures prescribed in the IEEE 802.11 standards. The stations may perform channel sensing of a primary 20 MHz channel according to the rules for channel sensing of the primary 20 MHz channel in the IEEE 802.11 standards.

However, for a secondary 20 MHz channel, secondary 40 MHz channel, and secondary 80 MHz channel, the station senses the channel for a duration of PIFS before transmitting the QoS Null frame in order to determine whether the secondary 20 MHz channel, secondary 40 MHz channel, and secondary 80 MHz channel are BUSY. The station then sets the parameter CH_BANDWIDTH_IN_NON_HT in TXVECTOR to one of 20 MHz, 40 MHz, 80 MHz, or 160 MHz according to the outcome of the channel sensing, as described for process 1300.

In another embodiment, the STA might decide to send the QoS Null frame in a High Throuput (HT), Very High Throughput (VHT) or a High Efficiency (HE) format and using a bandwidth of 40 MHz, 80 MHz, or 160 MHz. The QoS Null frame shall be carried in an HT PPDU, VHT PPDU or HE PPDU formats.

Figure 15:
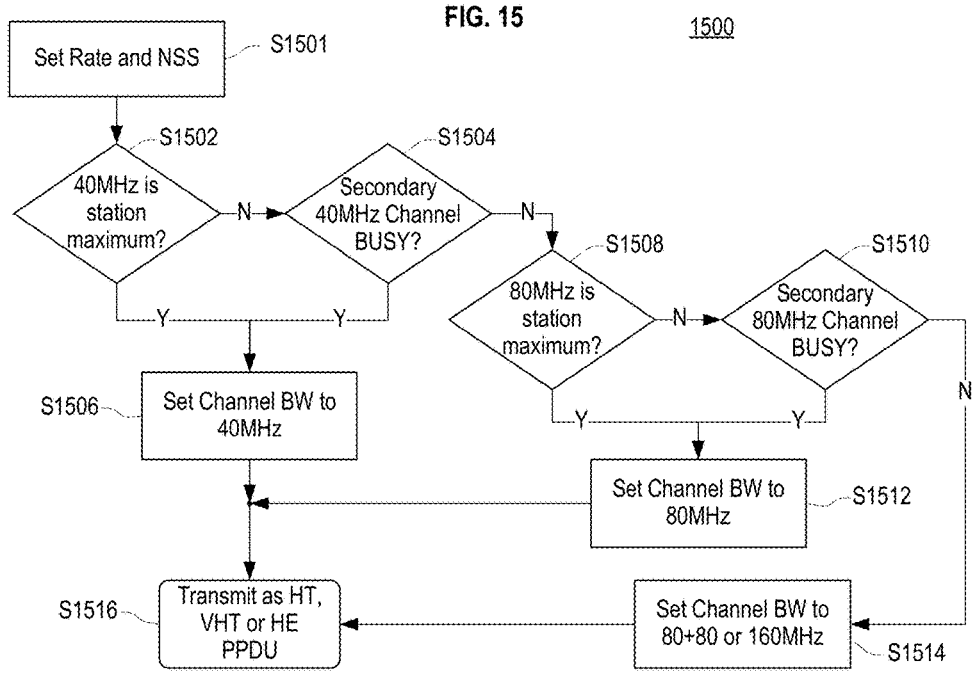
FIG. 15 illustrates a process for determining transmission characteristics of an HT, VHT, or HE QoS Null frame, according to the embodiment.

FIG. 15 illustrates a process 1500 for determining transmission characteristics, such as a rate, a number of spatial streams, and a bandwidth, of the HT, VHT, or HE QoS Null frame according to the embodiment.

At S1501, the process 1500 determines the rate and the number of spatial streams (NSS) for transmitting the QoS Null frame.

The QoS Null frame shall be transmitted by the station using a rate no higher than the highest rate in the BSSBasicRateSet parameter that is less than or equal to the rate or non-HT reference rate of the previously transmitted frame that was directed to the same receiving station. If no rate in the BSSBasicRateSet parameter meets these conditions, the QoS Null frame shall be transmitted at a rate no higher than the highest mandatory rate of the attached PHY that is less than or equal to the rate or non-HT reference rate of the previously transmitted frame that was directed to the same receiving station.

In some embodiments, the station might set a number of spatial streams of the frame that carries the QoS Null frame to one.

In other embodiments, the station might set the number of spatial streams to a value larger than one, that is, to a number of spatial streams that the station and an AP that is associated with the station can both communicate with. For example, if the AP can receive up to four spatial streams and the station can transmit the QoS Null frame with up to three spatial streams, then the STA might choose to transmit the QoS Null frame using one spatial stream, two spatial streams, or three spatial streams, all of which options can be received by the AP.

The bandwidth corresponds to a CH_BANDWIDTH parameter of the TXVECTOR. When a secondary 20 MHz channel is not BUSY, the station may transmit the QoS Null frame using the HT, VHT, or HE PPDU having i) a bandwidth determined according to the process 1500, and ii) contents of the primary 20 MHz channel duplicated in each other 20 MHz channel. Otherwise, the station may transmit the QoS Null frame using only the primary 20 MHz channel.

At S1502, the process 1500 determines whether a maximum bandwidth that the station is capable of operating at (i.e. a bandwidth at the time that the STA associated with the AP or a narrower bandwidth announced in an Operating Mode Notification sent by the STA or the AP) is 40 MHz; that is, whether both the AP and the station may not operate at a bandwidth wider than 40 MHz. When the maximum bandwidth is 40 MHz, the process 1500 proceeds to S1506. When both the AP and the station may operate at a bandwidth wider than 40 MHz, the process 1500 proceeds to S1504.

At S1504, the process 1500 determines whether a secondary 40 MHz channel is sensed as BUSY by the station at a PIFS time before transmission of the QoS Null frame. When the secondary 40 MHz channel is sensed as BUSY, the process 1500 proceeds to S1506. Otherwise, at S1504 the process 1500 proceeds to S1508.

At S1506, the process 1500 sets the channel bandwidth (that is, the process 1500 sets the CH_BANDWIDTH parameter of the TXVECTOR) to indicate 40 MHz. The process 1500 then proceeds to S1516.

At S1508, the process 1500 determines whether the maximum bandwidth that the station is capable of operating at is 80 MHz; that is, whether both the AP and the station may not operate at a bandwidth wider than 80 MHz. When the maximum bandwidth is 80 MHz, the process 1500 proceeds to S1512. When both the AP and the station may operate at a bandwidth wider than 80 MHz, at S1508 the process 1500 proceeds to S1510.

At S1510, the process 1500 determines whether a secondary 80 MHz channel is sensed as BUSY by the station at a PIFS time before transmission of the QoS Null frame. When the secondary 80 MHz channel is sensed as BUSY, the process 1500 proceeds to S1512. Otherwise, at S1510 the process 1500 proceeds to S1514.

At S1512, the process 1500 sets the CH_BANDWIDTH parameter of the TXVECTOR to indicate 80 MHz. The process 1500 then proceeds to S1516.

At S1514, the process 1500 sets the CH_BANDWIDTH parameter of the TXVECTOR to indicate 80+80 or 160 MHz. The process 1500 then proceeds to S1516.

At S1516, the process 1500 transmits the QoS Null frame in a VT, VHT, or HE PPDU format using a bandwidth indicated in the CH_BANDWIDTH parameter of the TXVECTOR.

In the process 1500, channel sensing is performed according to the rules of the IEEE 802.11 standards.

Figure 16:
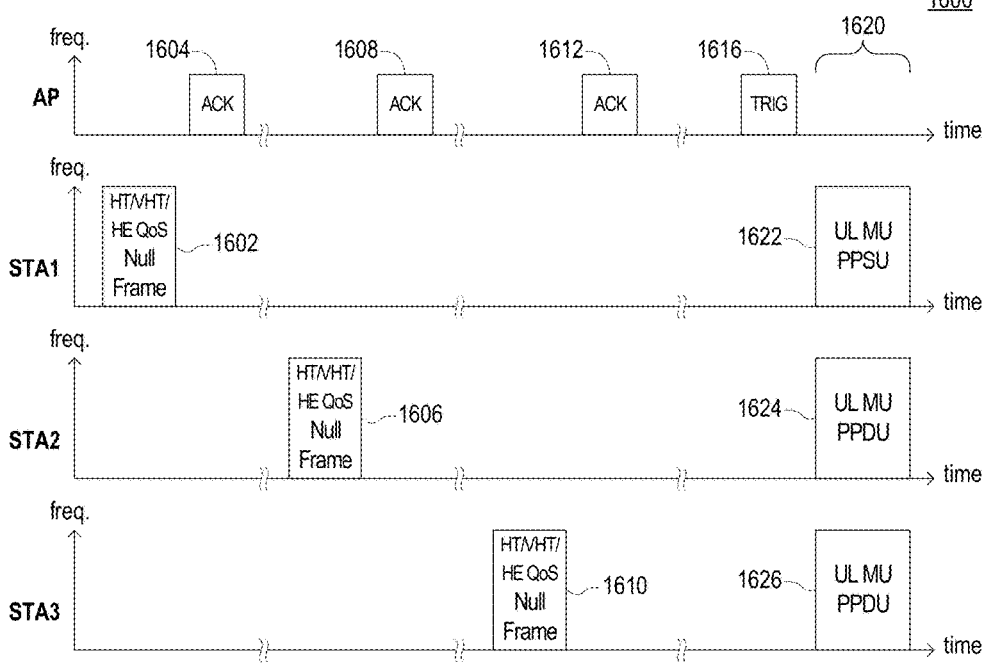
FIG. 16 illustrates a process incorporating QoS Null frames having HT, VHT, or HE formats and transmitted using bandwidths of greater than 20 MHz, according to an embodiment.

FIG. 16 illustrates a process 1600 incorporating QoS Null frames having HT, VHT, or HE formats and transmitted using bandwidths of greater than 20 MHz, according to an embodiment. The bandwidths of the QoS Null frames may be determined according to the process 1500 of FIG. 15.

In the example of FIG. 16, first, second and third stations STA1, STA2, and STA3 respectively set CH_BAND-WIDTH parameters of TXVECTORs to indicate 40 MHz, 80 MHz, 80+80 MHz, or 160 MHz according to the process 1500 of FIG. 15. As a result, each of the stations STA1, STA2, and STA3 may send respective QoS Null frames 1602, 1606, and 1610 with a full operational bandwidth of the BSS or with a narrower bandwidth than the full operational bandwidth of the BSS. The QoS Null frames 1602, 1606, and 1610 include Queue Size information of the respective stations STA1, STA2, and STA3.

The sequence of transmission of the QoS Null frames 1602, 1606, and 1610 does not necessarily happen after each other as shown in FIG. 16, and time may elapse between the transmission of each of the QoS Null frames 1602, 1606, and 1610.

The AP may determine respective frequency selectivity information for the stations STA1, STA2, and STA3 using the respective QoS Null frames 1602, 1606, and 1610, and may determine respective queue size information for stations STA1, STA2, and STA3 according to the Queue Size information included in the respective QoS Null frames 1602, 1606, and 1610. The AP the responds to the QoS Null frames 1602, 1606, and 1610 by transmitting respective ACK frames 1604, 1608, and 1612.

Each the QoS Null frame 1602, 1606, and 1610 still provides the AP with full information about the Queue Sizes of the respective station STA1, STA2, and STA3 even when transmitted using the narrower bandwidth.

However, any of the QoS Null frame 1602, 1606, and 1610 that is transmitted using the narrower bandwidth may not allow the AP to determine all of the frequency selectivity information of the respective station. In an embodiment, that AP may use previously determined frequency selectivity information for a given station when the AP receives a QoS Null frame with narrower bandwidth than the full bandwidth of the BSS from the station.

The AP may perform resource allocation according to the frequency selectivity information and queue size information obtained using the QoS Null frame 1602, 1606, and 1610. The AP may communicate information regarding the resource allocation to the STA1, STA2, and STA3 using a frame 1616 that includes trigger information.

The stations STA1, STA2, and STA3 perform an UL MU transmission 1620 according to the resource allocation information communicated in the frame 1616. The UL MU transmission 1620 includes UL MU PSDUs 1622, 1624, and 1626 respectively transmitted by the stations STA1, STA2, and STA3 using resources that the resource allocation information indicates the respective stations STA1, STA2, and STA3 have been allocated or are permitted to use.

In other embodiments, a station may use a frame other than a QoS Null frame to convey similar information or more information about the station's queue size and frequency selectivity status to an AP associated with the station. In an embodiment, a station might communicate one or more of the following status information to the AP as different subfields of a control frame or management frame:

(i)(a) A queue size for an indicated TID or for all access categories (equivalently all TIDs), expressed in one octet in units of a first size (e.g. 256 octets), or (i)(b) a queue size status per Access Category, expressed in four octets respectively corresponding to Voice (VO), Video (VI), Best Effort (BE), and Background (BK) ACs, each octet having a value in units of a second size (e.g. 256 octets or a size different that the first size).

(ii) A bandwidth and a sub-band resolution, expressed in one 1 octet, where the bandwidth is expressed in 2 bit having a value corresponding to one of 20, 40, 80, and 160 MHz and the sub-band resolution (or resource unit)

is expressed in three bits having a value that may correspond to one of 2 MHz, 4 MHz, and 8 MHz or to one of 10 MHz, 20 MHz, and 40 MHz or expressed in units of 26-tone, 52-tone, 106-tone, 242-tone, 484-tone and 996-tone.

(iii) One or more Modulation and Coding Scheme (MCS) values each expressed in four bits, wherein the MCS values respectively corresponds to one or more sub-band units (or resource units) according to the sub-band resolution, and an MCS value is reported for each of the sub-band units. The MCS values correspond to channel quality information.

(iv) One or more Number of Spatial Streams (NSS) values each expressed in three bits, wherein a) the NSS values may respectively correspond to one or more sub-band units according to the sub-band resolution, and an NSS value is reported for each sub-band units, b) an NSS may be reported for the whole bandwidth, or b) for an UL MU MIMO transmission, the NSS values may respectively correspond to a plurality of 20 MHz or 40 MHz sub-bands and an NSS value is reported for each of the 20 MHz or 40 MHz sub-bands.

In an embodiment, a station uses other control frames, including the above status information to report to an AP associated with the station, using a rate adaptation and bandwidth selection process similar to one of the processes 1300 and 1500 described for QoS Null frames. Accordingly, the station transmits the control or management frame to the AP using a non-HT duplicated format and a bandwidth of 40 MHz, 80 MHz, or 160 MHz, or using an HT, VHT or HE format and a bandwidth of 40 MHz, 80 MHz, or 160 MHz, according to what the format selection and channel sensing rules of the BSS allow.

In other embodiments, a station uses both a QoS Control field and an extended HT Control field (referred to herein as an HE Control Extension (HECE) or as an HE Control (HEC) field or HE variant of HT Control Field) to convey information about the queue size and frequency selectivity status of a station to an AP associated with the station.

Figure 17:
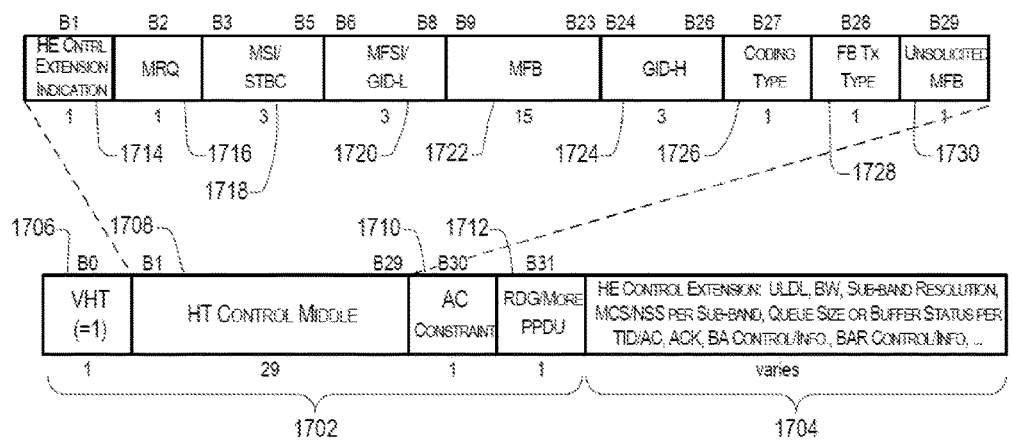
FIG. 17 illustrates an HT Control (HTC) field and an associated HE Control Extension HECE, according to an embodiment.

FIG. 17 illustrates an HT Control (HTC) field 1702 of a frame and an associated HECE 1704, according to an embodiment. The HTC field includes a VHT field 1704 subfield, an HT Control Middle subfield 1708, an Access Class (AC) Constraint subfield 1710, and an RDG/More PPDU subfield 1712.

The VHT field 1704 subfield indicates a variant type of the HT Control Middle subfield 1708. The VHT subfield 1704 is set to 1 to indicate that the HT Control Middle subfield 1708 is a VHT Variant. The VHT subfield 1704 is set to 0 to indicate that the HT Control Middle subfield 1708 is an HT Variant. In the embodiment of FIG. 17, the VHT subfield 1704 is set to indicate that the HT Control Middle subfield 1708 is the VHT Variant.

In the VHT Variant, the HT Control Middle subfield 1708 includes a first set of subfields that includes a MCS Feedback request (MRQ) field 1716, an MRQ Sequence Identifier/Space-Time Block Coding (MSI/STBC) subfield 1718, an MFB sequence identifier/Least Significant Byte (LSB) of Group ID (MFSI/GDI-L) subfield 1720, a NUM_STS, VHT-MCS, BW and Signal to Noise Ratio (SNR) feedback (MFB) subfield 1722, a Most Significant Byte (MSB) of Group ID (GID-H) subfield 1724, a Coding Type subfield 1726, a measured Frame Transmission Type (FB Tx Type) subfield 1728, and an Unsolicited MCS Feedback (MFB) subfield 1730. In an embodiment, the first set of subfields are subfields according to IEEE Std. 802.11ac-2013, §8.2.4.6.3.

In an embodiment, the first bit B1 of the HT Control Middle subfield 1708 is an HE Control Extension Indication (HECEI) subfield 1714. When the HECEI 1714 in the HT Control Middle 1708 VHT variant is set to a predetermined value (such as 1) then the associated HECE 1704 of the HTC field 1702 is included in the frame, otherwise the HECE 1704 is not included in the frame. In another embodiment, when the HECEI 1714 in the HT Control Middle 1708 VHT variant is set to a predetermined value (such as 1) then the associated HECE 1704 of the HTC field 1702 is included in the frame and B3-B31 bits are excluded such that after B0 1706 and B1 1714 of the HTC field 1702 the HECE 1704 follows.

The HECE 1704 may include some or all of the following information: an Up-Link-Down-Link (ULDL) indication, a bandwidth indication, a sub-band (or resource unit) resolution indication or index, respective MCS and NSS or other channel quality index (CQI) indications (such as SNR or SNIR) for the sub-bands with the indicated sub-band resolution or for the indexed sub-bands, an indication of request of a CQI report, indications of a plurality of sub-bands or RUs that a CQI report is requested or reported, and a queue size or plurality of queue sizes for a respective plurality of TIDs, Access Classes (ACs) or all ACs, a buffer status or plurality of buffer status for a respective plurality of TIDs, Access Classes (ACs) or all ACs, an indication of whether a queue size or buffer status is requested, indication(s) of the unit size of the plurality of requested queue size or buffer status, indication(s) of the unit size of the plurality of reported queue size or buffer status.

The HECE 1704 may also include an ACK subfield, BAR Control (with TID info), BAR Info (starting sequence control, and BA bitmap with short size such as 2 or 4 octets), BA Control (with TID info), BA Info (starting sequence control, and BA bitmap with short size such as 2 or 4 octets).

Information already reported in QoS field may be omitted from the HECE 1704. For example, in an embodiment, the queue size might only be reported (per AC, for a set of combined ACs, or for all ACs combined) in the QoS Control field and as a result no indication of queue size is reported in an HECE sub-field. However, in another embodiment, a queue size per AC or per TID may be reported in the HECE 1704 even when one or more queue sizes are reported in the QoS Control field. The HECE 1704 may also include an identification subfield to indicate what subset of the listed subfields in 1704 are carried in a specific instance of an HECE in a frame.

When a STA receives a frame (with matching receive address from its associated AP or associated STA) that carries an HECE field indicting a request for CQI, the STA sends a frame in response that carries an HECE field with a report including CQI for some or all the requested RUs or sub-bands, and if the STA does not have such CQI available, the STA sends a null CQI report. The response frame may be a QoS Null frame.

When a STA receives a frame (with matching receive address from, e.g., its associated AP) that carries an HECE field indicting a request for queue size or buffer status (of a TID or an AC or a plurality of TIDs or ACs), the STA sends a frame in response (such as QoS Null frame) that carries an HECE field with the queue size or buffer status reports, and if the STA does not have any pending data to send, the STA may report a null value to indicate its status.

When a STA receives a frame (with matching receive address) that carries an HECE field with BAR control and BAR Info subfields, the STA may send in response a frame such as QoS Null frame that carries an HECE field with BA Control and BA Info subfields, or the STA may send a BA frame in response.

When a STA receives a frame (with matching receive address) and processes and decodes the frame, the STA may send in response a frame such as QoS Null frame that carries an HECE field with an ACK subfield, or BA Control and BA Info subfields.

The ULDL indication being set to a first predetermined value (for example, one), indicates that MCS, NSS, SNR or other CQI indications per sub-band values in the HECE 1704 correspond to values that the station is going to or prefers to use for the specified sub-bands in the next one or more UL OFDMA or UL MIMO PPDUs, or the station recommends to the AP to be assigned to one or more of the specified sub-bands in the next one or more UL OFDMA or UL MIMO PPDUs.

The ULDL indication may be set to one when a station is going to participate in forming an upcoming UL OFDMA PPDU or UL MU MIMO PPDU in order to provide the AP with MCS values, NSS values, or other CQI values that the station would prefer to use for the specified sub-bands, should the AP make an assignment for the station in any of the sub-bands. In this situation, the MCS, NSS or other CQI values would be used by the AP to determine the sub-band (or resource unit) assignment, and MCS/spatial-stream (SS) assignment for the next UL OFDMA PPDU or UL MU MIMO PPDU, and the AP indicates the above values in the Trigger frame that initiates the UL MU transmission by the station. Based on the information reported in HECE 1704 and particularly the MCS, NSS and/or queue size values, the AP may decide not to include the station in the next UL MU MIMO PPDU or UL OFDMA PPDU.

When the AP assigns more than one sub-band with the specified resolution to the station in the next UL OFDMA PPDU or UL MU MIMO PPDU, then the station uses the most robust MCS and NSS from among the MCS and NSS indicated for the two or more sub-bands in the HECE 1704.

The ULDL indication being set to a second predetermined value (for example, zero), indicates that one or more values in the HECE subfield 1704 indicate recommended values for the AP to use in one or more upcoming DL OFDMA PPDUs or DL MU MIMO PPDUs. Per sub-band values for MCS, NSS, or other CQI values included in the HECE subfield 1704 may indicate recommended MCS values, NSS values, or both for the AP to use for each specified sub-band in an upcoming DL OFDMA PPDUs. Other MCS values and NSS values included in the HECE subfield 1704 may indicate recommended MCS values and NS S values for the AP to use for the next DL OFDMA PPDU or DL MU MIMO PPDUs. The AP may interpret the recommended of MCS and NSS values as solicited or unsolicited values according to other sub-fields in HT Control field.

Based on the information reported in HECE 1704 and particularly the CQI information such as MCS, NSS, and SNR and/or queue size values, the AP may decide not to include the station in the next DL MU MIMO PPDU or DL OFDMA PPDU.

When bandwidth information that is reported in the MFB sub-field 1722 of the VHT variant of the HT Control Middle field 1708 is duplicative of information that would otherwise have been communicated in the bandwidth indication of the HECE 1704, the bandwidth indication may not be included in the HECE 1704, and the bandwidth information of the MFB sub-field 1722 may be used to report the bandwidth.

The sub-band resolution indication in HECE 1704 specifies the sub-band bandwidth for which MCS and NSS values may be reported. Because the HECE 1704 can be used for both DL OFDMA and UL OFDMA operation, then depending of the sub-band assignment in an OFDMA PPDU, the values for MCS, NSS, or both for a particular sub-band may change depending on the condition of the channel between the AP and the station at the particular sub-band. As a result, the HECE sub-field 1704 may include a list of MCS, NSS or other CQI values for all the sub-channels with the specified sub-band resolution.

In an embodiment, a bandwidth resolution for MCS and a bandwidth resolution for NSS may be different, an as a result the HECE sub-field 1704 may report two sub-band resolution values to be reported.

In an embodiment, a bandwidth resolution for NSS might be a priori fixed, such as by being fixed to 20 MHz sub-bands. In such an embodiment, the bandwidth resolution for MCS may differ from the bandwidth resolution for NSS.

In an embodiment, the HECE 1704 may be included in a QoS Null frame as well as in other types of frames. Accordingly, embodiments described above as employing a QoS Null frame may include an HECE subfield 1704 in the QoS Null frame.

The behavior in the above embodiments may be performed based on the capability of a station. In other words, a station might perform as described above only if its capability allows, otherwise the station would send the QoS Null frames according to the existing rules in IEEE 802.11 standards.

A capability field, referred to herein as an HE Capabilities element, may be used to determine whether to behave according to one or more of the above embodiments or according to the existing rules in IEEE 802.11 standards. The fields of the HE Capabilities element may include, among others, a field indicating whether a station is capable of transmitting a QoS Null frame with a bandwidth wider than 20 MHz; such a field is referred to herein as an Implicit Wideband Operation field.

In an embodiment, the Implicit Wideband Operation field may occupy one bit. For devices operating as an AP, the Implicit Wideband Operation field may be reserved. For non-AP stations, the Implicit Wideband Operation field this field may set to a first predetermined value (such as one) when the station is capable of sending QoS Null frames with bandwidth wider than 20 MHz (according to the conditions explained above), and otherwise may be set to a second predetermined value (such as zero).

The Implicit Wideband Operation field may be assigned to other HE elements, but its usage is the same as described above.

In another embodiment, the Implicit Wideband Operation field may include two or more bits. For non-AP stations, the Implicit Wideband Operation field may be set to a first predetermined value (such as one) when the station is capable of sending QoS Null frames with a bandwidth of 40 MHz (according to the conditions explained above), set to a second predetermined value (such as two) when the STA is capable of sending QoS Null frames with a bandwidth of 80 MHz (according to the conditions explained above), set to a third predetermined value (such as three) when the STA is capable of sending QoS Null frames with a bandwidth of 170 MHz or 80+80 Mhz (according to the conditions explained above), and set to a fourth predetermined value (such as zero) when the STA is only capable of sending QoS Null frames with a 20 MHz bandwidth.

Figure 18:
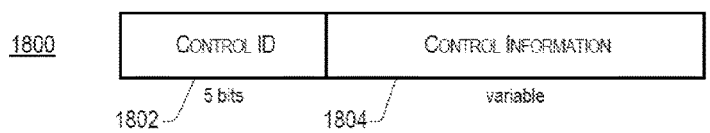
FIG. 18 illustrates a High Efficiency (HE) Control (HEC) field, according to an embodiment.

FIG. 18 illustrates a specific structure of HE Control (HEC) field 1800 according to another embodiment. In an HE WLAN, the HEC field 1800 may be included in an HT Control field of a MAC header of a frame or in an HE Aggregate Control (HEAC) field.

The HE Control (HEC) field 1800 includes a Control ID field 1802 having 5 bits, and control Information 1804 included in zero or more bits.

The HEC field 1800 has one of a plurality of types. The type of the HEC field 1800 may be identified by the Control ID field 1802. Each type of HEC field 1800 has an a priori known length, and as a result, an indication of the length of the HEC field 1800 is not required.

In an embodiment, boundaries between an HEC fields 1800 and another HEC field may occur at a bit level, that is, an HEC field 1800 may include some but not all of bits of an octet. In another embodiment, boundaries between the HEC fields 1800 and another HEC field may occur at the boundaries of an octet when a size of the control information is a multiple of eight bits.

Figure 19:
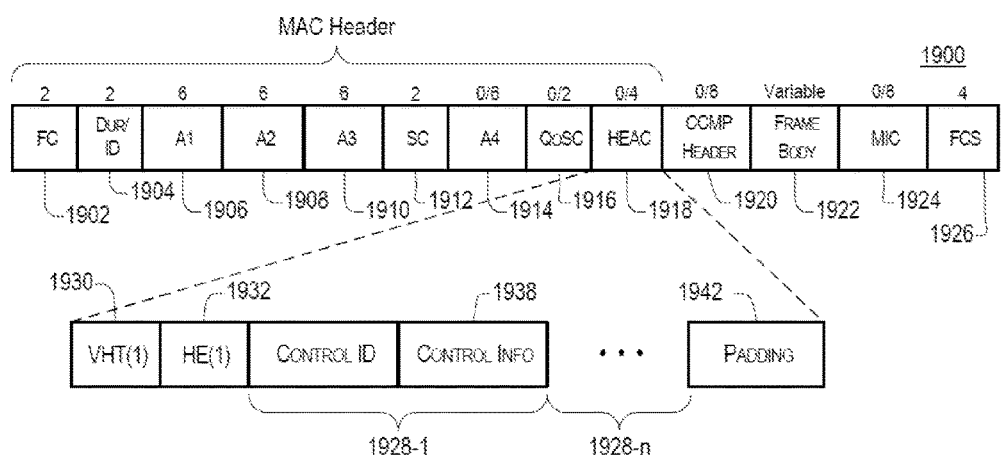
FIG. 19 illustrates a frame of an HE WLAN, according to an embodiment.

FIG. 19 illustrates a frame 1900 of an HE WLAN, according to an embodiment.

A MAC header of the frame 1900 includes a Frame Control field 1902, a Duration/ID field 1904, a Sequence Control field 1912, a QoS Control field 1916, and Address 1, Address 2, Address 3, and Address 4 fields 1906, 1908, 1910, and 1914. The frame 1900 further includes an optional Cypher Block Chaining Message Authentication Code (CBC-MAC) Protocol (CCMP) Header field 1920, an optional Frame Body 1922, an optional Message Integrity Code (MIC) field 1924, and a Frame Check Sum (FCS) 1926. These fields may be defined by an applicable IEEE 802.11 standard.

The MAC header of the frame 1900 further includes a HE Aggregate Control (HEAC) field 1918 according to an embodiment. The HEAC field 1918 includes a VHT bit 1930 that may be set to one and an HE field 1932 that may be set to one. The HEAC field 1918 further includes a first HEC field 1928-1, and may include additional HEC fields **1928-*n*. The HEAC field 1918 may further include Padding 1942 so that the length of the HEAC field 1918** may be equal to a predefined length (such as 4 octets) or a multiple of a predefined length.

In an embodiment, the HEAC field 1918 may be padded so as to have a length of four octets. In another embodiment, the HEAC field 1918 may be padded so as to have a length that is a multiple of four octets. In another embodiment, the size of HEAC field 1918 could be larger than four bytes with no restriction to being a multiple of four bytes.

Each HEC field 1928 in the HEAC field 1918 may be one of a plurality of types. Each type of HEC field 1928 carries control information 1938 about a specific operation. For example, the HEAC field 1928 may carry control information 1938 about one or more of ACKs, Block ACKs (BAs), QoS Control, Channel Quality Information Control (CQIC), Uplink Scheduling Info, Receive Operating Mode Indication (ROMI), Resource Allocation, power control, and the like.

The HEC field for carrying CQIC (HEC-CQIC) carries channel quality indications in the form of MCS/NSS (and possibly Coding and DCM) recommendation or SNR measurement for a recipient of a frame that carries the HEC-CQIC field. In some embodiments, HEC-CQIC field may include, among other information, a CQIC-token, MCS feedback, NSS feedback, SNR report, BW, and a Resource Unit (RU) index. A reserved value for the RU index would indicate that the feedback reports are for full band. Other values for the RU index indicate a specific RU that the feedback MCS, NSS, and/or Signal and Interference to Noise Ratio (SINR) are reported for.

The HEC-CQIC may additionally include:

An Up-Link Multi-User (ULMU) subfield that indicates whether one or more of SNR/SNIR, MCS, NSS, Coding, and DCM values are parameters that helps the AP to efficiently schedule an UL MU transmission for the STA in a subsequent UL MU frame that the STA is going to participate in. In an embodiment, the ULMU subfield plays the same role as ULDL subfield in 1704. The subsequent UL MU frame may be expected to be within the same TXOP or the same Beacon Interval as the frame carrying the HEC-CQIC. Such an HEC-CQIC might also be called an HEC-Rate Adaptation.

A CQIC Time (CQICT) subfield that indicates for what duration or interval of time the suggested one or more of SNR/SNIR, MCS, NSS, Coding, and DCM values are valid.

Embodiments of the present disclosure concern rate adaptation in trigger-based frames. Based on the content of a trigger frame and the rules of 11ax trigger-based frame, an AP decides what MCS and NSS (and other parameters such as Coding and DCM) a station should use in the upcoming UL MU frame. The AP also maintains a record of the rate (MCS, NSS, Coding, and DCM) that a station will use in the upcoming UL MU frame.

In contrast, in an industry practice, a station determines its own MCS, NSS, and Coding parameters. Embodiments allow an AP to perform UL MU rate adaptation to produce MCS, NSS, and Coding parameters for a station based on the suggested values fed back by the STA such as the SNR/SINR, MCS, NSS, and Coding parameters.

When an AP allocates a Resource Unit (RU) for the first time (for a unit interval of time such as a TXOP or one or more Beacon intervals) to a station, the allocation being announced in a trigger frame for a subsequent UL MU frame, the AP chooses one or more of an MCS, NSS, Coding and DCM for the station. The station shall follow the selected one or more of MCS, NSS, Coding, and DCM values when participating in the subsequent UL MU frame. Embodiments disclosed hereinafter give more control of the rate adaptation to the station.

After the first UL MU frame transmission (in the unit interval of time such as the TXOP or the one or more Beacon intervals) where the AP has chosen one or more of the MCS, NSS, Coding, and DCM for the initial UL MU frame, the STA may indicate different values for one or more of the MCS, NSS, Coding, and DCM to the AP using a HE Control field (such as HEC-CQCI or HEC-Rate Adaptation field disclosed above).

In a first embodiment, when the station indicates a set of one or more MCS, NSS, Coding, and DCM recommended values to the AP within a HE Control field (such as an HE Control field of one or more MAC headers of an MPDU or Aggregate MPDU (A-MPDU) that was sent in the earlier UL MU transmission), the AP may use the one or more of MCS, NSS, Coding, and DCM recommended values in a subsequent trigger frame when the AP is going to schedule another UL MU for the station within the given unit interval of time. In another embodiments, the AP may use the one or more of SNR/SINR feedback values to determine MCS, NSS, Coding and DCM parameters for a subsequent trigger frame when the AP is going to schedule another UL MU for the station within the given unit interval of time.

In an embodiment, the unit interval of time may be the current TXOP. In another embodiment, the unit interval of time may be the current Beacon interval.

In another embodiment, the unit interval of time may be indicated by a CQICT subfield in the HEC-CQIC field that carried the one or more of MCS, NSS, Coding, and DCM recommended values to the AP.

In another embodiments, when the station indicates a different one or more MCS, NSS, Coding, and DCM recommended values to the AP via a HE Control field, the AP shall use the recommended one or more of MCS, NSS, Coding, and DCM recommended values provided by the station in a subsequent trigger frame when the AP is going to schedule another UL MU frame for the station within the given unit interval of time (for instance in the current TXOP, or in current Beacon interval).

In such embodiments wherein the AP shall use the one or more MCS, NSS, Coding, and DCM recommended values in the subsequent UL MU frame, the AP may not include one or more of MCS, NSS, Coding, and DCM subfields in a Per-User Info field associated with the station providing the recommended values in an HE-SIG-B field, so that the Per-User Info field has a shorter length. In an embodiment, such Per-User Info fields with shorter lengths might be identified with a predetermined indicator at the beginning of the Per-User Info field, or may be identified in the Common Info field of the HE-SIG-B field.

In some cases, an initial UL MU frame sent by the station may not be successfully decoded by the sender of the trigger frame (that is, by the AP). When this occurs, the AP may not retrieve the content of an HEC-CQIC field in the MAC header of any of the MPDUs in the A-MPDU within the UL MU frame. As a result, the AP would not receive the one or more of MCS, NSS, Coding, and DCM recommended values.

When the AP fails to successfully decode any of one or more HEC-CQIC fields sent by the station, the AP shall determine the MCS, NSS, Coding, and DCM values for the station. However, if at least one MPDU that carries an HEC-CQIC field is successfully decoded then the AP may use the one or more of MCS, NSS, Coding, and DCM recommended values for the next UL MU transmission within the given unit interval of time that the station is scheduled for. In some embodiments, the AP shall use the one or more of MCS, NSS, Coding, and DCM recommended values for the next UL MU transmission within the given unit interval of time that the station is scheduled for.

Embodiments include processes through which a station communicates, to an AP associated with the station, information that may be useful for performing one or more of DL OFDMA, UL OFDMA, and UL MU MIMO operations. Embodiments include processes that uses QoS Null frame to communicate queue size and frequency selectivity state to the associated AP in order to enhances OFDMA operations.

Embodiments include processes for rate adaptation of trigger-based frames. Embodiments include procedures through which each station may retain at least partial control over the rate adaptation for the trigger-based frame. The proposal includes processes to indicate and handle the control information within HE Control (HEC) and HE Aggregate Control fields. The embodiments advantageously provide rate adaptation that is closer to the industry practice and that is likely to be closer to an optimum rate adaption. Furthermore, embodiments provide a more scalable solution than processes that rely entirely on the sender of the trigger frame to perform rate adaption.

The solutions provided herein have been described with reference to a wireless LAN system; however, it should be understood that these solutions are also applicable to other network environments, such as cellular telecommunication networks, wired networks, etc.

The above explanation and figures are applied to an HE station, an HE frame, an HE PPDU, an HE-SIG field and the like of the IEEE 802.11ax amendment, but they can also applied to a receiver, a frame, PPDU, a SIG field, and the like of the next amendment of IEEE 802.11. Furthermore, some embodiments have been described with respect to a secondary channel, but embodiments are not limited thereto.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSSs 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

In some cases, an embodiment of the invention may be an apparatus (e.g., an AP station, a non-AP station, or another network or computing device) that includes one or more hardware and software logic structure for performing one or more of the operations described herein. For example, as described above, the apparatus may include a memory unit, which stores instructions that may be executed by a hardware processor installed in the apparatus. The apparatus may also include one or more other hardware or software elements, including a network interface, a display device, etc.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method implemented by a first wireless device operating in a wireless network for communicating status, the method comprising:
   generating a frame for transmission to a second wireless device operating in the wireless network, wherein generating the frame includes:
      inserting, by the first wireless device into a High Throughput (HT) Control field of the frame, buffer status information for multiple traffic identifiers (TIDs); and
   transmitting, by the first wireless device, the frame to the second wireless device in the wireless network, wherein the second wireless device uses the buffer status information to allocate resources of a transmission to the second wireless station.

2. The method of claim 1, wherein generating the frame further includes:
inserting, by the first wireless device into the HT Control field of the frame, an indication as to whether the buffer status information represents all TIDs active between the first wireless device and the second wireless device.

3. The method of claim 1, wherein generating the frame further includes:
inserting, by the first wireless device into the HT Control field of the frame, an indication of access categories represented by the buffer status information.

4. The method of claim 1, wherein generating the frame further includes:
inserting, by the first wireless device into the HT Control field of the frame, channel quality information (CQI) per one or more resource units of a wireless channel.

5. The method of claim 4, wherein the CQI includes one or more of a preferred modulation and coding scheme, a preferred number of spatial streams, a signal to noise ratio, and a signal to interference and noise ratio.

6. The method of claim 4, wherein generating the frame further includes:
inserting, by the first wireless device into the HT Control field of the frame, an indication whether the CQI is associated with an uplink transmission or a downlink transmission.

7. The method of claim 4, wherein a resource unit is a continuous set of sub-carriers of a wireless channel assigned for a single transmission in a multiple user transmission.

8. The method of claim 1, wherein generating the frame further includes:
inserting, by the first wireless device into the HT Control field of the frame, a first indication that the buffer status information describes a combined buffer size for the multiple TIDs on the first wireless device awaiting transmission to the second wireless device.

9. The method of claim 8, wherein generating the frame further includes:
inserting, by the first wireless device into the HT Control field, a second indication that indicates units for the combined buffer size.

10. The method of claim 1, wherein generating the frame further includes:
inserting, by the first wireless device into the HT Control field of the frame, an indication that the buffer status information describes a request for information regarding one or more buffers on the second wireless device.

11. The method of claim 10, wherein the buffer status information includes one or more of a set of TIDs or a set of access categories for which a combined buffer size is requested and units for representing the combined buffer size.

12. The method of claim 1, wherein the HT Control field is a High Efficiency (HE) variant.

13. A method implemented by a first wireless device operating in a wireless network for communicating status, the method comprising:
receiving, by the first wireless device, a frame from a second wireless device operating in the wireless network;
decoding the frame, wherein decoding the frame includes:
determining, by the first wireless device using a High Throughput (HT) Control field of the frame, buffer status information for multiple traffic identifiers (TIDs); and
allocating, by the first wireless device using the buffer status information, resources of a transmission to the first wireless station.

14. The method of claim 13, wherein decoding the frame further includes:
determining, by the first wireless device using an indication in the HT Control field of the frame, whether the buffer status information represents all TIDs active between the second wireless device and the first wireless device.

15. The method of claim 13, wherein decoding the frame further includes:
determining, by the first wireless device using an indication in the HT Control field of the frame, access categories represented by the buffer status information.

16. The method of claim 13, wherein decoding the frame further includes:
determining, by the first wireless device using the HT Control field of the frame, channel quality information (CQI) per one or more resource units of a wireless channel.

17. The method of claim 16, wherein the CQI includes one or more of a preferred modulation and coding scheme, a preferred number of spatial streams, a signal to noise ratio, and a signal to interference and noise ratio.

18. The method of claim 16, wherein decoding the frame further includes:
determining, by the first wireless device using an indication in the HT Control field of the frame, whether the CQI is associated with an uplink transmission or a downlink transmission.

19. The method of claim 13, wherein decoding the frame further includes:
determining, by the first wireless device using a first indication in the HT Control field of the frame, that the buffer status information describes a combined buffer size for the multiple TIDs on the second wireless device awaiting transmission to the first wireless device; and
determining, by the first wireless device using a second indication in the HT Control field of the frame, units for the combined buffer size.

20. The method of claim 13, wherein decoding the frame further includes:
determining, by the first wireless device using an indication in the HT Control field of the frame, that the buffer status information describes a request for information regarding one or more buffers on the first wireless device,
wherein the buffer status information includes one or more of a set of TIDs or a set of access categories for which a combined buffer size is requested and units for representing the combined buffer size.

* * * * *